United States Patent [19]
Teshima et al.

[11] Patent Number: 5,783,880
[45] Date of Patent: Jul. 21, 1998

[54] MOTOR FOR DRIVING INFORMATION MEDIUM

[75] Inventors: Hiroyoshi Teshima, Saihaku-gun; Hironobu Nishida, Yonago, both of Japan

[73] Assignee: Matsushita Electric Industrial Co., Ltd., Kadoma, Japan

[21] Appl. No.: 561,916

[22] Filed: Nov. 22, 1995

Related U.S. Application Data

[62] Division of Ser. No. 57,486, May 6, 1993.

[30] Foreign Application Priority Data

| May 8, 1992 | [JP] | Japan | 4-30050 |
| May 8, 1992 | [JP] | Japan | 4-30051 |
| May 8, 1992 | [JP] | Japan | 4-115685 |
| Jan. 26, 1993 | [JP] | Japan | 5-1560 |
| Jan. 29, 1993 | [JP] | Japan | 5-2143 |
| Jan. 29, 1993 | [JP] | Japan | 5-14027 |

[51] Int. Cl.[6] .......... H02K 7/14; H02K 11/00; H02K 21/22; H02K 17/42
[52] U.S. Cl. .......... 310/67 R; 310/68 B; 310/156; 310/168
[58] Field of Search .......... 310/67 R, 68 B, 310/156, 166, 168; 360/98.07, 99.04, 99.08

[56] References Cited

U.S. PATENT DOCUMENTS

| 3,714,483 | 1/1973 | Numberg et al. | 310/256 |
| 4,667,257 | 5/1987 | Chan | 360/133 |
| 4,669,008 | 5/1987 | Ichihara | 360/133 |
| 4,836,631 | 6/1989 | Shimazu et al. | 310/46 |
| 5,151,836 | 9/1992 | Ichihara | 360/99.05 |
| 5,243,242 | 9/1993 | Cap et al. | 310/67 R |
| 5,245,234 | 9/1993 | Okada et al. | 310/68 B |
| 5,254,895 | 10/1993 | Koizumi | 310/156 |
| 5,311,383 | 5/1994 | Yokouchi | 360/99.12 |
| 5,319,271 | 6/1994 | Shimada et al. | 310/68 B |

FOREIGN PATENT DOCUMENTS 61-52350  4/1986  Japan .

*Primary Examiner*—Clayton E. LaBalle
*Attorney, Agent, or Firm*—Cushman Darby & Cushman IP Group of Pillsbury Madison & Sutro LLP

[57] ABSTRACT

In a thin type flexible disk drive motor, in order to improve undesirable jittering of rotation, an inertia ring of larger diameter than that of the rotor frame is fixed immediately under the rotor. The inertia ring consists of a short cylinder part of the larger diameter to be fixed under the rotor frame and a flange part of the diameter not smaller than that of FG (frequency generation) magnet part. The disk drive motor also has a drive pin engaging assembly that allows a drive pin to be secured within a hub of the flexible disk while stabilizing the drive pin and after disk chucking.

3 Claims, 42 Drawing Sheets

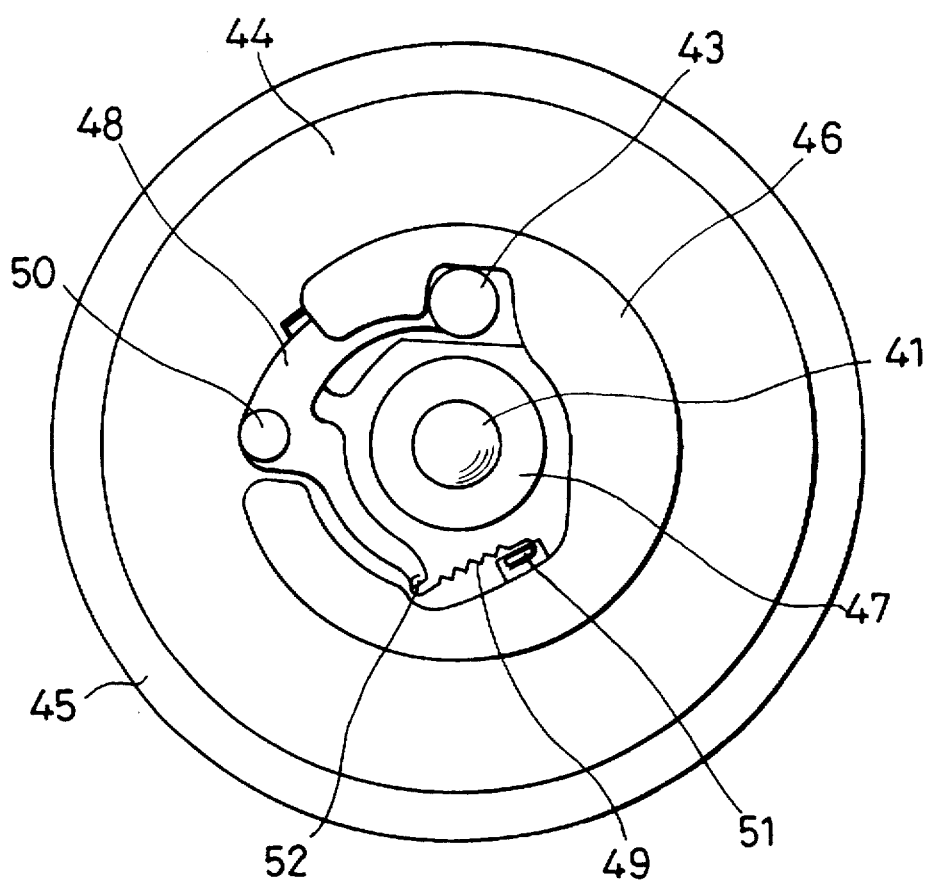
F I G. 14

FIG. 38(a)
FIG. 38(b)
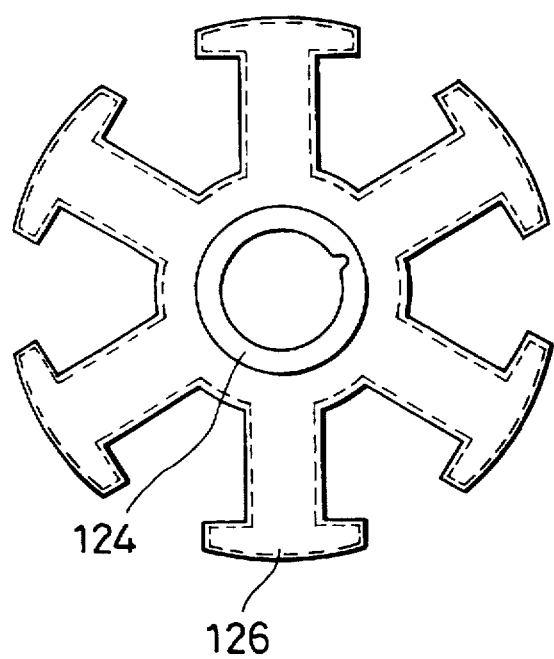
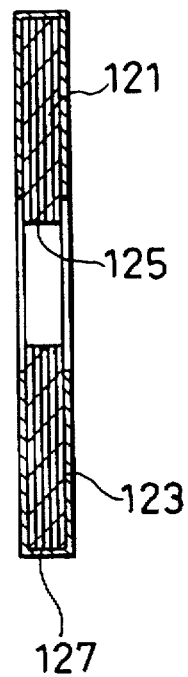

FIG. 39(a)
FIG. 39(b)
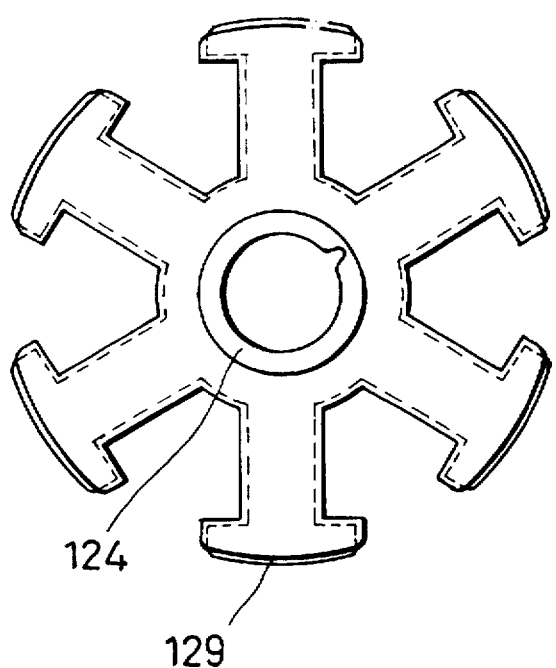
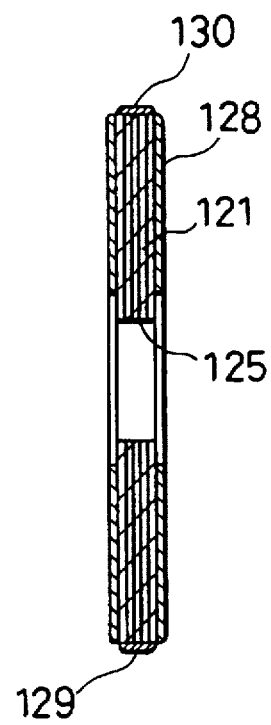

MOTOR FOR DRIVING INFORMATION MEDIUM

This is a division of application Ser. No. 08/057,486, filed May 6, 1993.

FIELD OF THE INVENTION AND RELATED ART STATEMENT

1. Field of the Invention

This invention relates to a motor used for driving a memory device in the OA (office automation) field and VTRs in the AV field which are required to be miniaturized and thinned. In particular, the improvement relates mainly to a rotor for rotating a disk type memory medium including a magnetic disk, such as a micro-flexible disk which houses a sheet magnetic disk in a hard cassette, and to a structure of a chucking part. The improvement also relates to rust-preventive treatment of a motor core and insulation treatment between a coil and a core.

2. Description of the Related Art

Recently, a need has arisen for miniaturization of memory devices in the OA fields or VTR devices in the AV field. To the end flexible disk driving devices for a disk of 3.5 inch diameter are widely used as an information storage apparatus which houses a magnetic disk sheet in a hard cassette. The flexible disk driving devices have a thicknesses of 1 inch, ¾ inch and ⅔ inch for a recent lap top type computer, or ½ inch for a notetype personal computer. Drive motors for these uses are now being developed.

The rotor of a drive motor for the disk driving device of the ½ inch thickness type has a depth or height which is less than ½ of that for the motor of the disk drive device of the 1 inch thickness type. Thus, the rotation inertia of such rotor is small, and it is difficult to reduce the jitter of the motor due to the thin shape of the core and the magnetization distribution of a magnet. Therefore, there is a need to increase the rotation inertia of the motor. Furthermore, it is necessary to constitute a frequency generation magnet (hereinafter described a FG magnet) and a hub magnet with high accuracy and reliability.

In addition, recently the standard of the disk of such a high capacity as more than 4 megabytes has been specified, and the development of a rotation drive device for the high capacity disk is being activated. In the disk drive devices for the 3.5 inch flexible disk, almost all the devices have a structure wherein the disk is driven by engaging a drive pin with a drive pin insertion hole provided eccentrically to the center of a metal disk hub. As to a chucking structure of a drive motor for the high capacity thin type disk, little work has been done in this area.

Furthermore, responding to the miniaturization and high performance of the apparatus, the motor performance is being improved by narrowing a gap between an iron core (also called a core) and a magnet of the motor. In such a motor or an HDD motor, rust prevention of the core is often required. In addition, the cores of motors for aeronautical and space industry, such as a space station or the cores of motors for a special environment e.g. of high humidity, are subjected to rust preventive treatment in many cases.

Furthermore, responding to the thinning of the motor, insulation treatment between the coil and the core has begun by using a thin resin molding insulator, and a method of using the insulator of a thickness less than 0.2 mm is desired.

Before explaining the motor, the flexible disk having 3.5 inch diameter (hereafter 3.5 inch flexible disk) will be explained.

[Conventional 3.5 inch flexible disks]

As shown in FIG. 40, the 3.5 inch flexible disk has a structure in which a sheet magnetic disk 172 is rotatably housed in a cassette 171 which is formed by jointing a pair of upper and lower shells made of hard plastic in a opposed relation. In the center of the disk, a metal disk hub 173 is fixed, and in the center of the disk hub 173, a square shape shaft insertion hole 174 is provided in a manner to engage with the end of a motor shaft. In an eccentric position to the center, a rectangular drive pin insertion hole 175 is formed so as to engage with a drive pin in a slant relation with respect to the shaft insertion hole 174, and the disk hub 173 is exposed in a circular opening 176 of the center of the lower shell. A head insertion hole 177 is opened and closed by a shutter 178. FIG. 40 shows a state of shutter 178 closing.

In the rotation drive of the 3.5 inch flexible disk thus structured, the motor has a shaft. The end of the shaft engages with the shaft insertion hole 174 of the disk, which is provided in the center of the rotor and a drive pin engaging with the drive pin hole 175 of the disk. The drive pin hole is provided at an eccentric position with respect to the center of the rotor. By inserting the shaft and the drive pin into the shaft insertion hole 174 and the drive pin insertion hole 175 of the disk thereby engaging these holes, respectively, the disk is driven by the rotation of the rotor.

[1. Conventional FD drive motor]

A conventional motor for disks rotation drive will be explained.

FIG. 41 is a sectional view showing a conventional motor for disk rotation drive, FIG. 42 is a sectional perspective illustration showing an integrally molded FG magnet portion of the conventional type. In FIGS. 41 and 42, a reference numeral 131 denotes a shaft; 132 a spindle hub; 133 a drive pin; 134 a rotor frame; 135 an FG magnet; 136 a hub magnet; 137 a lubricant sheet; 138 a rotation lever; 139 a flange portion of the rotor frame 134; 140 a drive magnet; 141 a coil; 142 a printed board; 143 a hole provided in the flange portion 139; 144 power generation wire element group; 145 a magnetic pole face of the FG magnet; 146 a ball bearing; 147 an oil impregnated metal; 148 a bearing housing; and 149 a core.

The principle of the chucking structure of a disk will be explained later, and thus its explanation is omitted here.

The rotor of a motor rotates smoothly on the shaft 131 which is supported by the ball bearing 146 and the oil impregnated metal 147. On the shaft 131, the rotor frame 134 is mounted via the spindle hub 132 on which the lubricant sheet 137 is sticked. The drive magnet 140 is fixed to an inner face of a hanging portion of the rotor frame 134. On a flange portion of the rotor frame 134 a frequency generation magnet (hereinafter FG magnet) 135 made by resin or rubber is fixed, and magnetization for frequency generation is applied to the face 145. On the printed board 142 opposing the magnetization face 145, the power generation wire element group 144 is disposed, and generates a voltage as the motor rotates, and this voltage is inputted to a motor control circuit to control the motor. The disk should rotate with a constant number of revolutions per minute, for example, 300 rpm or 360 rpm, thus the motor should be controlled to rotate at a constant rpm.

The servo characteristic of a motor will be explained below. In the stator of the motor, the coil 141 is wound on the insulated core 149 and the above stator core 149 is attached to the bearing housing 148 which fixes the ball bearing 146 and the oil impregnated metal 147, and furthermore the bearing housing 148 is attached to the printed board 142 by caulking. Current is supplied from the printed board 142 to the coil 141 and a magnetic field is generated from the salient-pole of the core 149 and rotates the rotor frame 134 attacking the drive magnet 140.

Conventionally, as shown in FIG. 41, the FG magnet 135 is generally bonded to the flange portion 139 of the rotor frame. However, there was a problem of undesirable separation of the bonded FG magnet during the motor driving. In order to prevent this separation of the FG magnet, as shown in FIG. 42, holes 143 were radically provided in the flange portion 139, and the FG magnet 135 was molded integrally with the flange portion 139 on its bottom face, having an outer diameter less than the flange outer diameter of the rotor frame.

[2. Another conventional FD drive motor]

Another conventional motor for disk rotation drive will be explained below.

FIG. 43 is a sectional view showing a conventional motor for disk rotation drive. FIG. 44 is an assembled view showing a hub structure for disk chucking of the conventional disk rotation drive device. In FIGS. 43 and 44, a reference numeral 151 denotes a shaft; 152 a hub magnet; 153 a lubricant sheet; 154 a drive pin; 155 a rotation lever; 157 a coil spring for actuating of rotation; 158 a coil spring for upward actuation of the drive pin 154; 159 a spindle bush; and 160 a rotor.

As to the motor for disk rotation drive structured as to mentioned above, its performance will be explained.

First, a disk (see FIG. 40) is inserted into a disk rotation drive device, and the disk hub 173 is attracted by the magnetized hub magnet 152, as the disk is installed. The disk hub 173 rides on the lubricant sheet 153. At the same time, the shaft 151 is inserted in the shaft insertion hole 174 of the disk hub 173 to engage therewith. When a position of the drive pin 154 and a position of the drive pin insertion hole 175 do not meet, the drive pin 154 is depressed by the disk hub attractive force of the hub magnet 152, and the coil spring 158 compresses so as to push the drive pin 154 away from the disk.

When a position of the drive pin 154 and a position of the drive pin insertion hole 175 meet as the rotor 160 rotates, the drive pin 154 is inserted into the insertion hole 175 by the return force of the coil spring 158. At this time, the shaft 151 engages with the shaft insertion hole 174 by the coil spring 157, thereby actuating the rotation lever 154 outward. The drive pin 154 is pushed to the outer crest side of the drive pin insertion hole 175. Then, after making a further rotation, the drive pin 154 rolls on the above-mentioned crest side, and engages with the insertion hole 175 in such a manner that relative movement between the disk hub 173 and the drive pin 154 becomes zero. At this time, the disk is surely chucked by the drive pin 154 and the disk is driven.

[3. Conventional disk chucking part of FD drive motor]

A conventional motor for disk rotation drive will be explained.

FIG. 45 is a view showing a disk chucking portion of a conventional motor for disk rotation drive, FIG. 46 is an illustration showing floating of a rotation lever when the conventional drive motor chucks a disk. In FIGS. 45 and 46, a reference numeral 181 indicates a shaft; 182 a spindle hub; 183 a spring member or an elastic rotation lever; 184 a drive pin; 185 a pillar; 186 a hub magnet; 187 a lubricant sheet; 188 a rotor frame.

As to the chucking portion of the disk drive motor structured as mentioned above, its performance will be explained below.

First, a disk (shown in FIG. 40) is inserted into the disk device, and the disk hub 173 is attracted by the hub magnet 186 made of magnetized resin or rubber as the disk is installed and the shaft 181 is inserted into the shaft insertion hole 174 of the disk hub. When a position of the drive pin 184 and a position of the drive pin insertion hole 175 of the disk hub meet, the above drive pin 184 is inserted into the drive pin insertion hole by elastic return force of the rotation lever 183, directed toward the disk hub. Furthermore, when the motor shaft 181 continues to rotate, the drive pin 184 slides, contacting with the outer crest face of the drive pin insertion hole 175 of the disk hub 173, and engages with the drive pin insertion hole 175 in a manner that relative movement between the disk hub 173 and the drive pin 184 becomes zero. At this time the torque of the motor is transmitted to the disk hub and the disk integrally rotated with the motor.

[4. Conventional hub structure in FD drive means]

A hub structure of a motor for the conventional disk rotation drive will be explained.

FIG. 47 is a view showing a hub structure for disk chucking of the conventional disk rotation drive motor. In FIG. 47, a reference numeral 190 indicates a: spindle hub; 191 a shaft; 192 a hub magnet; 193 a lubricant sheet; 194 a rotation lever made of an elastic material; 195 a drive pin; 196 an actuation spring; 197 a rotor frame; 198 a rotation pillar of the rotation lever; 199 a contact portion of the hub magnet.

As to the disk rotation drive motor structured as mentioned above, its performance will be explained.

When a disk (see FIG. 40) is not inserted into the disk rotation drive device, the drive pin 195 contacts with the contact portion 199 of the hub magnet 192 by the spring 196 which actuates the rotation lever 195 outward.

When disk is inserted into the disk drive device, and the disk hub 173 is attracted by the magnetized magnet 192 and supported by the spindle hub 190 on which the lubricant sheet 193 is located. Simultaneously the shaft 191 is inserted thereby engaging with the center of the disk hub 173. When a position of the drive pin 195 and a position of the drive pin insertion hole 175 do not meet, the activated drive pin 195 is depressed by the disk hub attractive force of the hub magnet 192, contacting with and sliding on the contact portion 199 of the hub magnet 192.

When a position of the drive pin 195 and a position of the drive pin insertion hole 175 meet as the rotor rotates, the drive pin 195 is returned by magnetization attractive force on the face side of the rotor frame 197 of the hub magnet 192 and elastic return force of the actuation spring 196 and by the rotation lever 194, upon insertion into the drive pin insertion hole 175. When the rotor rotates, the drive pin 195 separates from the contact portion 199 of the hub magnet and is pushed on the outer crest side of the drive pin insertion hole. Furthermore the drive pin 195 rotates sliding on the above crest side and engages with the insertion hole in a manner that relative movement between the disk hub 173 and the drive pin 195 becomes zero. At this time the disk is surely chucked by the drive pin 195 and is rotation-driven.

[5. Another conventional chucking mechanism]

In addition, other conventional example is shown in FIG. 48, and FIG. 48(a) is a plan view showing a chucking structure of a disk rotation drive device of an embodiment, and FIG. 48(b) is a sectional view showing the same. In FIG. 48, a reference numeral 201 denotes a shaft; 202 a spindle hub made of a plastic magnet; 203 a drive pin; 204 a flat spring; 205 a contact portion on which the drive pin actuated by the flat spring contacts in the radical direction of the spindle hub; 206 a disk hub receiving face comprised of a part of the spindle hub.

The drive pin 203 is fixed to the flat spring 204 provided on the reverse face to the disk hub receiving face of the spindle hub 202, which integrally rotates with the shaft 201.

The operation will be explained with reference to the structure of FIG. 48.

The disk hub is attracted by the spindle hub 202 made of a magnetized plastic magnet as the disk is inserted and installed. Then the disk hub is attracted on the disk hub receiving portion 206 provided on the spindle hub magnet 202. Simultaneously, the shaft 201 is inserted into the shaft insertion hole 174 of the disk hub. When a position of the drive pin insertion hole 175 and a position of the drive pin 203 do not meet with each other, the drive pin 203 is pushed in the direction of the shaft axis with the disk hub by attractive force acting between the spindle hub 202 and the disk hub; and the drive pin 203 runs away on the bottom face of the spindle hub.

Next, when the shaft 201 starts to rotate, the spindle hub 202 relatively rotates with respect to the disk hub, which is made stationary by pinch force of magnetic heads. Then, when a position of the drive pin 203 and a position of the drive pin insertion hole 175 meet to each other, the disk is returned by the flat spring on the bottom face of the spindle hub; and thus the drive pin 203 is inserted into the drive pin insertion hole 175. When the shaft continues to rotate further, the drive pin 203 moves in the drive pin insertion hole of the disk hub; and when the relative movement of the drive pin 203 to the drive pin insertion hole becomes zero, the drive pin 203 starts to transmit the torque of the shaft 201 to the disk hub, and thereafter the disk integrally rotated with the shaft.

[6. A conventional core configuration]

The core of a conventional motor will be explained referring to the drawings.

FIG. 49 is a structural view showing a conventional motor with brushes, FIG. 50 is a view showing an armature winding assembly of the motor of FIG. 49. In FIGS. 49 and 50, a reference numeral 221 indicates a core; 222 a shaft; 223 an insulation; 224 a magnet; 225 a coil; 226 a frame; 227 a commutator terminal board; 228 a brush.

The structure configured as mentioned above will be explained.

The armature winding assembly is made such that the motor core 221 formed by laminating silicon steel plates is fixed to the shaft 222 and the insulator 223 formed into a shape of the core by resin molding is inserted into the core 221. The commutator terminal board 227 is press-fitted into the shaft 222, and then the coil 225 is wound on the core and current condition portions of the coil 225 are fixed to predetermined positions of the commutator terminal board 227 and conduction circuits are completed by soldering. Next, the commutator surface of the commutator terminal board of the armature winding assembly undergoes lapping processing and whole of the armature winding assembly is washed.

The motor is assembled in the manner as follows. A metal is fixed to the center of the frame 226. The magnet 224 is attached to an inner periphery of the hanging portion of the frame outer periphery. The magnet 224 is magnetized. The armature is washed. The shaft of the winding assembly is inserted into the metals. A bracket with brushes is fixed to the frame.

[7. A conventional resin-molded rotor core configuration]

FIG. 51 is a view showing a core of a motor wherein the iron core is integrally formed with resin. In FIG. 51, a reference numeral 231 denotes a core; and 232 resin.

The structure configured as mentioned above will be explained.

The motor core 231 made by laminating silicon steel plates integrally molded with resin 232. An insulation resin film is formed on the surface of the core to insulate the coil from the core; and the coil is wound on the resin. If the resin 232 is protruded from the outer periphery of the core 231, the clearance between the resin and the magnet becomes narrow. Therefore a metal mold is made, matching the outer diameter of the core 231, and thereby the clearance between the core 231 and the metal mold is so narrowly adjusted that the resin are not allowed to protrude into the clearance. Thus insertion of the core 231 into the metal mold is difficult for an automatic machine, and thereby the insertion must be manually performed in many cases.

[8. A conventional motor for driving HDD flexible disk]

FIG. 52 is a structural view showing a conventional HDD motor. In FIG. 52, a reference numeral 233 indicates a core; 234 a shaft; 235 a powder coating film; 236 a magnet; 237 a coil; 238 a rotor hub; 239 a bracket; 240 a rust preventive coating film.

The structure configured as mentioned above will be explained.

The surface of the core 233 is formed by laminating magnetic materials, then applying an insulation treatment by the so-called powder coating, in which a powdered insulation material such as epoxy is directly sprayed on the surface followed by a heating of the sprayed coating. Thereby an insulation layer is formed. The outer peripheral surface of the core opposing to the magnet is not provided with the powder coating film 235, but undergoes known rust preventive treatment of brushing a known rust prevention varnish or paint, thereby forming a rust preventive coating film 240 on the outer peripheral surface of the core 233.

A ball bearing which supports the shaft 234 is fixed by adhesion to the hole of the central cylinder portion of the bracket 239. On the outer periphery of the central cylinder portion of the bracket 239, the coil 237 is wound on the core 233, which then undergoes the powder coating insulation and is attached by adhesion to the inner periphery of the rotor hub 238.

However, in the conventional structure of adhering the FG magnet shown in FIG. 41, besides the magnet separation there were such problems that clearances between a printed board and the FG magnet face are nonuniform due to non-uniform heights of adhesion of the FG magnet; and this affects voltages generated by the frequency generating magnet pole and has an adverse effect on motor Jitter. Furthermore, the above clearance is made narrow because of the thinning of a motor. Thus, if the height of FG magnet face varies, the magnet touches the printed board.

Still furthermore, when the FG magnet and the flange are integrally molded as shown in FIG. 42, touching on the printed board is eliminated as in the case of FIG. 41. However there was also a problem that the bottom face of the flange portion is a part face of a metal mold, and thus the FG magnet is on the side of the fixed metal fold, and the rotor frame is pulled by the fixed metal mold when releasing the mold, then a gap arises between the flange bottom face and the FG magnet. When using a disk rotation drive device incorporating the above rotor frame having the gap for a long time, the gap between the flange and the FG magnet becomes large. Therefore the FG magnet face is apt to touch on the printed board.

The main object of the present invention is to solve the above-mentioned conventional problems. Therefore it is an object of the present invention to provide a motor for disk rotation drive, which provides secure disk chucking and to realize rationalization of assembling work and thinning, and which has a rotor frame such that an FG magnet is free from stress at a releasing from metal mold, the FG magnet being integrally molded simultaneously with a spindle hub magnet.

Hereupon, in the conventional structure of FIG. 41, a height of the motor frame becomes low, and furthermore a plate thickness of the rotor frame becomes thin as the motor goes thin, thus the rotation inertia of the rotor small. Therefore, inertia effect bar maintaining accuracy of revolution is small; and this results in an adverse effect on Jitter.

When the plate thickness of the rotor frame is reduced, there arises a problem that leakage of magnetic flux increases because a magnet made of neodymium-iron-boron is used for a drive magnet, and the leakage magnetic flux flows into a magnetic head, and this provides an obstacle to the thinning of the rotor frame thickness.

The present invention solves the above problem, and therefore it is an object of the present invention to provide a thin type brushless motor in which an inertia ring is attached to an outer periphery of the rotor frame to increase the inertia capacity of the rotor and which has a good accuracy of revolution and less leakage magnetic flux.

In the conventional structure of FIGS. 43 and 44, the drive pin 154 is activated upward by the coil spring 158, thus the above drive pin 154 needs the structure of the coil spring 158. As a result, it is necessary to provide a large gap inside the motor, therefore, this provides an obstacle to the thinning of the disk drive motor. Furthermore, it is also necessary to provide the rotation lever 155 and the activation spring 157 for rotation activating the drive pin 154, therefore the rotation drive motor unavoidably has a complex chucking mechanism and was an expensive rotation drive device.

Furthermore, the coil spring 157 for rotation activating the rotation lever 155 is provided under the rotor 160 and the chucking mechanism is formed inside the motor, that is, under the rotor, therefore these make an obstacle to thinning of the disk rotation drive motor.

The present invention solves the above conventional problems, and therefore it is an object of the invention to provide a motor for disk rotation drive which can be thinned.

In the conventional structure of FIGS. 45 and 46, the drive pin is fixed to the end of the rotation lever 183 having spring elasticity, thus if the rotation lever is not provided with means for restraining vertical movement of itself, the rotation lever moves downward when a disk is inserted because the disk hub depresses the drive pin. At the moment the drive pin enters the drive insertion hole, the rotation lever freely jumps up by the upward return force. Therefore, variations of chucking positions of the drive pin are large and thus the index positions of the disk vary, and this impairs readout of information stored in the disk as well as inter changeability of information.

As the moment the relative movement between the disk hub 173 and the drive pin 184 becomes zero, the drive pin 184 receives a shock. The shock applied to the drive pin is transmitted to the rotation lever and sometimes the lever bends upward as shown in FIG. 46. There was no major problem while the rated number of revolution of the device was 300 rpm or 360 rpm, however high capacity devices operate at a high speed of 600 rpm. In such a case, the above shock is large and some chucking mechanisms caused a problem.

In such a case, there was a problem that relation of positions of the drive device rotor and the disk becomes unstable and shift of index burst occurs.

The present invention solves the above problem, and therefore it is an object of the present invention to provide a motor for disk rotation drive in which bending of the rotation lever or floating of the drive pin is prevented, thereby to stabilize a chucking position of the drive pin.

In the case of the conventional example of FIG. 47, the drive pin activated by the activation spring contacts with the hub magnet. Each time the disk is clucked, the activated drive pin contacts with and slides on the contacting portion of the hub magnet. Therefore there was a problem that the chucking sometimes becomes unstable depending upon the molding of the face of the contacting portion. For example, in the case of integrally molding the hub magnet and the rotor frame, a parting line arises in a corner on a disk installation side and a molding burr occurs, thus sometimes a position of the drive pin was unstable or return of the drive pin was prevented. When removing the burr before assembling, it is necessary to ensure that the hard squeal layer of the magnet does not appear and the working itself was difficult.

Furthermore, when adhering the lubricant sheet to the spindle hub, there was also a problem that centering of the sheet with the shaft is very difficult working, moreover, when adhering, the sheet contains air, thereby generating bubbles in a gap between the spindle hub and the lubricant sheet, thus the flatness of the lubricant sheet becomes bad and chucking error is apt to occur. Still furthermore, adhesive paste for the lubricant sheet extrudes from the side of the lubricant sheet and sticks to the disk hub, and this lowers the reliability of the chucking.

In the case of the conventional example of FIG. 48, when chucking the disk, the drive pin is activated toward its outer periphery by the flat spring. However, the flat spring is carried elasticity and as a result, bends radially when chucking. Consequently, a position of the drive pin becomes unstable and an index position varies, therefore the drive pin is sometimes provided with a restrainer to restrain its radial movement. In the case of FIG. 48, a drive pin previously contacts with a spindle hub of a plastic magnet, therefore the drive pin does not move radially but contacts with the magnet when chucking, thus the drive pin contacts with and slides on the magnet when chucking. Therefore, there is the same problem as that of the conventional example of FIG. 47.

In addition, the spindle hub directly receives the disk hub, thus there was a problem that sliding resistance between the magnet and the disk hub is large in order to reduce this sliding resistance, it is reasonable to reduce an area of a receiving face, but there was also a problem that attraction stability, at the spindle hub face, of the disk hub is impaired.

The present invention solves the above problems, and therefore, it is an object of the present invention to provide a motor for disk rotation drive in which floating of the drive pin is prevented, thereby to stabilize a chucking position of the drive pin.

In a motor with brush, contact materials of brushes and a commutator are included, and so an armature is washed in a state of an assembly. Thus, punch oil used when cores are pressed does not remain in the assembly, therefore a press-broken face of the core which is opposed to a magnet is apt to rust under high humid environment. In the motor with brush, a clearance between the core and the magnet is generally about 0.5–0.8 mm, and so motor troubles did not occur. Recently, in some motors their characteristics are graded up by reducing this clearance, and it is considered that abnormal revolution of the motor due to rust occurs in special environment.

In the case of the core which is made by integrally molding an insulation resin film on a surface of a motor core formed by laminating silicon steel plates, a process of inserting the core into a metal mold and a process of winding are manually performed, and thus there was a problem that a worker touches the outer periphery of the core, and so if leaving in a humid place the outer periphery of the core rusts. Therefore handling of the core is troublesome and thus there was a problem that sometimes the outer periphery of the integrally formed core undergoes rust prevention treatment by brushing and working becomes complex.

In an HDD motor, rust prevention treatment is performed by brushing on an outer peripheral surface of a core made by laminating magnetic materials, and rust prevention coating is applied to the core. Powder coating is applied to a surface of a coil winding. The thickness of the rust prevention coating film is relatively thick, moreover the thickness varies greatly, thus there was a problem that the motor performance can not be improved by narrowing a gap between the motor core and the magnet.

The present invention solves the above problems, therefore it is an object of the present invention to provide a motor core which undergoes the rust prevention treatment combining insulation treatment by applying chemical conversion treatment to a laminated core only before insulation treatment and giving a this rust prevention film to the core or by controlling a coating thickness by performing electro deposition.

OBJECT AND SUMMARY OF THE INVENTION

In order to attain these objects, a motor for disk rotation drive of the invention has a special structure and manufacturing method in which holes are provided in several places of hub magnet set positions of a rotor frame body and several places of a flange portion, which is provided, substantially perpendicularly to a shaft, on a rotor frame outer periphery, and a chamber is provided on each hole periphery face, opposed to a FG magnet set face, of the flange portion, and furthermore an outer peripheral end face of the flange portion is provided with a stepped portion whose magnet set side portion protrudes as compared to the face of the chambers, then the hole portions including the chambers and stepped portion are integrally molded of the FG magnets, in the rotor frame, simultaneously the hole portions of the rotor frame body are integrally molded of the hub magnets, on the rotor frame.

In addition, a motor of the present invention has a rotor structure in which an inertia ring is fixed on the outer periphery of the rotor frame to an inertia.

The motor for disk rotation drive of the invention has a structure in which an elastic rotation lever is made to have an effect of a coil spring which activates a drive pin upward, and the drive pin is fixed to an end of said rotation lever, then the rotation lever is so attached to a pillar provided outside a rotor that it rotates, taking the pillar as a supporting point, and the rotation activating coil spring is hung on the rotation lever and the rotor within a thickness of the rotor, and a chucking mechanism is structured within the thickness of the rotor.

The motor for disk rotation drive of the invention has a structure in which a protruding portion is made by extending an end of a rotation lever, on a drive pin side and this protruding portion is made to contact with a hook portion provided near a rotor frame drive pin or with a stopper portion provided near a hub magnet drive pin.

The motor for disk rotation drive of the invention has a structure in which a protruding portion is provided by cutting and raising a part of a rotor frame and so movement of a drive pin is restrained by contacting the drive pin with the protruding portion or by contacting a rotation lever with a cut and raised hook portion of the rotor frame.

In addition, a disk hub receiving face is coated with a low friction resin layer to reduce sliding resistance with a disk hub, while limits of a level variation of a disk mounting face is standardized within a range of a circular area having a diameter of 6 mm to 13 mm, and so an inner diameter portion of the disk hub receiving face of a spindle hub is formed into a recess so as not to contact with the disk hub.

A motor core undergoes rust prevention treatment by a chemical conversion treatment such as phosphoric acid manganese treatment, electroless nickel plating treatment, cool phosphoric treatment, low temperature blackening treatment, high temperature blackening treatment, berrozinc treatment, Parylene treatment, or coating treatment such as electrode position, ultraviolet rays hardening type electrodeposition.

According to this structure, the hole of the rotor frame flange portion has the chamber on the face opposed to the FG magnet set face and the end face on the flange outer periphery has a stepped portion in which the FG magnet set face protrudes as compared with the face of the chamber, and so stress at releasing a metal mold is not applied to the FG magnet, thus a gap does not arise between the flange and the FG magnet.

Thus the FG magnet can be integrally molded so that the distance from the rotor frame top face, that is, the hub magnet set face, to the FG magnet face is constant, thereby the clearance between the printed board and the FG magnet face becomes uniform, and this eliminates the effect on generating voltage of a frequency generation magnetic pole, thereby improving the motor jitter. Furthermore, the level variation of the FG magnet face becomes small, therefore containing with the printed board is eliminated, thus the above clearance can be reduced and the thinning of the motor becomes possible.

Moreover, the distance between the disk hub face and the magnet hub face varies depending upon the distance from the rotor frame top face to the hub magnet face, that is, the thickness of the hub magnet. The thickness of the integrally molded hub magnet depends upon an accuracy of a metal mold, thus the variation of the thickness is small and attractive force of the disk hub is constant, thereby chucking with a disk is stabilized. In addition, the assembling work can be rationalized by using the structure of integrally molding the hub magnet and the FG magnet with the rotor frame simultaneously.

As mentioned above, according to the configuration of the invention, the part face of a metal mold can be utilized as the flange face on the rotor frame top face side, thus the rotor is not pulled at releasing the metal mold, and stress scarcely occurs in the hole and the stepped portions for preventing separation of the FG magnet, and this has a good effect on a countermeasure to crack of the FG magnet in the heat shock test (for example, −40° C. and 60° C. alternately, each one hour, 20 cycles). Furthermore, the face of the FG magnet on which the frequency generation magnetic pole is magnetized has a constant distance from the rotor frame top face, and thereby the motor jitter is improved, as well as the clearance between the FG magnet face and the printed board is stabilized. Thus this clearance can be made smaller and thinning of a motor can be realized. These greatly contributes to the industrialization in this field.

This structure enables to increase the rotation inertia of the rotor, to reduce an inertia gain of a motor servo-characteristic and to improve the motor jitter. Furthermore, a double structure of the motor frame thickness and the inertia ring thickness enables to reduce magnetic leakage flux from the drive magnet and to increase a permeance factor, thereby improving the motor S-T characteristic.

As mentioned above, in the present invention, the inertia ring is fixed to the rotor of a miniaturized, thinned motor to increase inertia capacity, thereby reducing a gain of G(s), that is, a gain of a motor servo characteristic. Thus adverse effects of a torque ripple and cogging torque are reduced, and a motor having a small jitter can be realized.

In addition, because of the double structure of the thickness of the rotor frame and the thickness of the inertia ring, a leakage magnetic flux from the drive magnet can be reduced, thereby the S-T characteristic of a motor can be improved.

This structure enables the elastic rotation lever to have an effect of a coil spring activating the drive pin upward, thereby simplifying the structure of the drive pin, and enabling the rotation lever to be fixed outside the rotor as compared with a conventional rotor containing lever therein, and the chucking mechanism to be assembled within a range of the rotor thickness, thereby enabling thinning of the motor. The chucking mechanism has a small number of parts comprised of the drive pin, rotation lever, pillar, and the coil spring, thereby enabling to provide a low cost motor.

The drive pin is made to generate the rotation activating force by fixing one end of the rotation activating coil spring to the hook provided at the end of the rotation lover extending on the reverse side of the drive pin to the pillar and hanging the other end on the hook of the rotor. In the case that the rotor is formed of a part of the rotor frame, the rotor frame is provided with another hook for the activating coil spring. In the case of the above rotor frame, the rotation activating coil spring is structured within a thickness less than that (less than 1.0 mm) of the hub magnet or the rotation activating coil spring can be structured within a thickness less than that of the rotor frame and the hub magnet by boring in the rotor frame a recess hole for the spring, thus a low cost and thin type motor can be made.

The hub magnet which attracts the disk hub is integrally molded on the outer face of the rotor frame which integrally rotates with the shaft engaged with the shaft insertion hole of the disk hub, and the rotation lever of elastic material, which can rotate taking the pillar provided on the rotor frame outer face as a supporting point, is fixed on the rotor frame outer face. The drive pin is fixed to one end of this rotation lever, and the spring hook or the hole is provided at the other end of the rotation lever which extends in the reverse direction of the drive pin to the pillar. One end of the rotation activating coil spring is fixed to the hook or the hole and the other end of the coil spring is hung on the spring hook of the rotor frame, thereby to make the drive pin generate rotation activating force. By configuring the rotation lever and the drive pin within a range of the height of the hub magnet, a thin type rotation drive device can be produced.

Furthermore, the hole for the coil spring is formed in the rotor frame, and the coil spring is fixed to one end of the rotation lever. The other end of the coil spring is hung on the spring hook which is provided near the other end of the coil spring hole, thereby to make the drive pin generate rotation activating force. By setting the coil spring within a range summing the height of the hub magnet and the plate thickness of the rotor frame, an inexpensive and thinned rotation drive device can be produced.

Using this structure, at the moment the relative movement between the disk hub and the drive pin becomes zero, the protruding portion of the above rotation lever contacts the hook of the rotor frame or the stopper of the hub magnet, and the bending of the rotation lever does not occur, at the same time a position of the rotation lever at disk chucking is stabilized, as well as the bloating of the drive pin can be prevented.

As mentioned above, in the present invention, the protruding portion is provided at the end of the rotation lever attached via the pillar to the rotor frame and the protruding portion is made to contract the rotor frame or the hub magnet, thereby bending of the rotation lever is eliminated and the position of the rotation lever at disk chucking is stabilized, while the position of disk chucking of the drive pin fixed to the rotation lever is made constant. Furthermore, floating of the drive pin can be prevented by the protruding portion of the rotation lever, and the rotation lever is prevented from deformation against magnetic head load variation or shocks, and shift of the index burst also can be avoided.

Using this structure, the cut and raised face of the cut and raised portion of the rotor frame which contacts the drive pin can be shaped by a metal mold and can be formed into a flat face having no burn, thus chucking can be stably performed.

When contacting the rotation lever with the hook of the rotor frame, a position of the drive pin in the direction of the outer periphery is stabilized, moreover a position of disk chucking of the drive pin attached to the rotation lever is made constant, and he floating of the drive pin can be prevented, thus the rotation lever can be protected from deformation against load variation or shock.

Owing to the low friction resin layer of the spindle hub, the sliding resistance with the disk hub can be reduced, moreover the recess portion inside the spindle hub does not contact with the disk hub, therefore stable disk chucking can be performed.

As mentioned above, in the present invention, the drive pin is made to contact the cut end raised portion of the rotor frame to restrain the drive pin from moving toward the outer periphery or from moving radially, thereby stabilized chucking can be performed.

When the rotation lever is made to contact the hook portion of the rotor frame, a position of the drive pin toward the outer periphery is stabilized, furthermore a position of disk chucking of the drive pin fixed to the rotation lever is made constant and floating of the drive pin is also prevented, thereby the rotation lever is protected from deformation against magnetic head load variation or shocks, and shift of the index burst also can be avoided.

Due to the low friction resin layer of the spindle hub, the sliding resistance between the spindle hub and the disk hub can be reduced, and moreover the recess portion inside the spindle hub does not contact with the disk hub, thus stabilized disk chucking can be performed.

Using the above structure, the laminated core only is subjected to chemical conversion treatment, thus applying powder coating to the core after the chemical conversion treatment, or integrally molding a resin insulator or the core with resin can be performed using equipment in the step before chemical conversion treatment. Performance of the motor can be improved by narrowing a gap between the motor core and the magnet.

As can be seen from the above explanation, apart from the conventional powder coating and resin insulators used for core wherein rust prevention treatment is made by applying a varnish to the core face opposing to the magnet face by brush coating, in the present invention the rust prevention varnish is applied to the laminated core only before insulation treatment of providing a thin rust prevention treatment film. Thereby mass-production and low cost of rust prevention treatment can be realized. Besides, in case of electrodeposition a motor core can be made by combined rust prevention plus insulation treatment by controlling the film thickness.

When electrodeposition is applied to a motor core, the electrodeposited coating also plays a role of insulation between the core and the coil, thereby enabling to do mass-productive and inexpensive rust-prevention treatment.

BRIEF DESCRIPTION OF THE DRAWINGS

FIG. 14 is a view showing a structure of a hub, which chucks a magnetic disk, of one embodiment of the invention;

FIG. 35(a) is a view before assembling and FIG. 35(b) is a partially enlarged view;

FIG. 36(a) is a view before assembling and FIG. 36(b) is a sectional view of a spindle hub attached to a rotor frame;

FIG. 38(a) is a front view showing a laminated core of a motor in accordance with one embodiment of the invention and FIG. 38(b) is a view showing a section of FIG. 38(a);

FIG. 39(a) is a front view showing a laminated core of a motor in accordance with one embodiment of the invention and FIG. 39(b) is a view showing a section of FIG. 39(a);

It will be recognized that some or all of the Figures are schematic representations for purposes of illustration and do not necessarily depict the actual relative sizes or locations of the elements shown.

DESCRIPTION OF THE PREFERRED EMBODIMENT

The embodiments of the present invention will be explained with reference to the drawings.

[Embodiment 1]

A first embodiment of the present invention will be explained.

Figure 1:
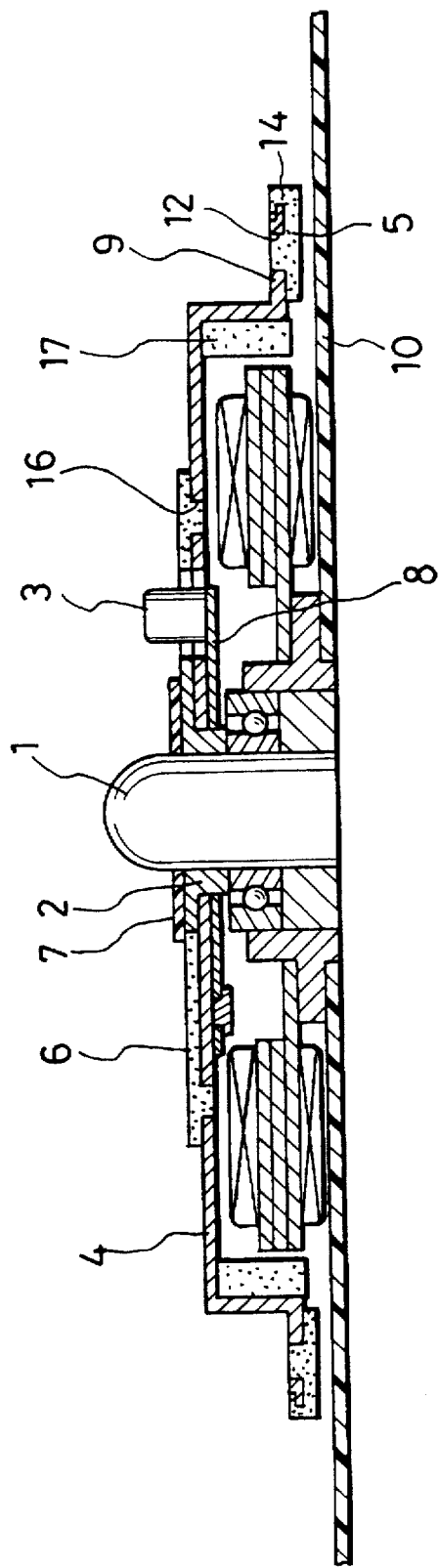
FIG. 1 is a sectional view showing a disk rotation drive device of one embodiment of the invention.
Figure 2:
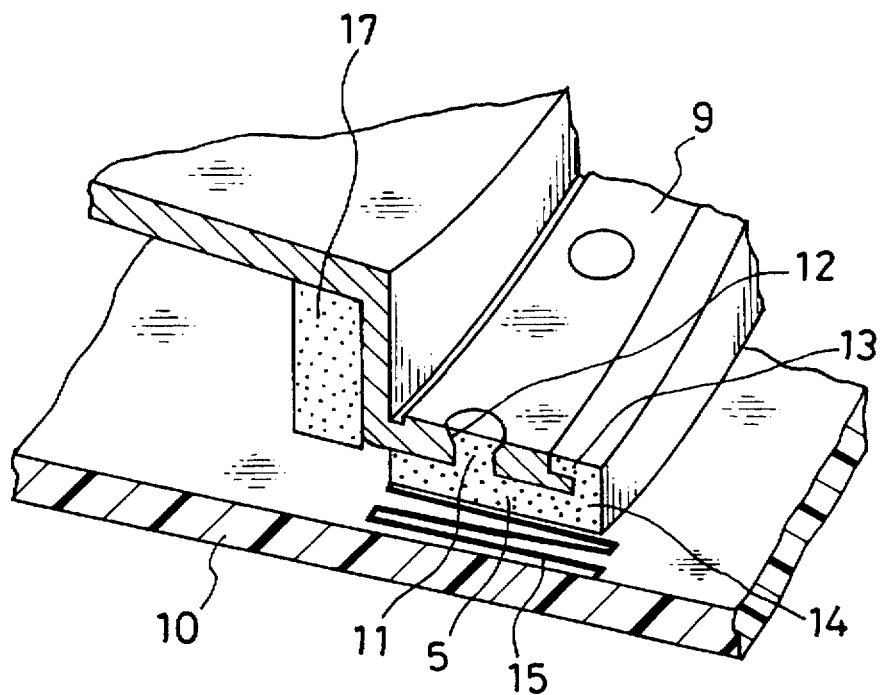
FIG. 2 is an illustration showing a section of a molded FG magnet of a flange portion of a rotor frame according to one embodiment of the invention.

FIG. 1 is a sectional view showing a motor for disk rotation drive of the first embodiment of the invention. FIG. 2 is an illustration showing a section of a molded FG magnet of a flange portion of a rotor frame.

In FIG. 1 and 2, a reference numeral 1 denotes a shaft; 2 a spindle hub; 3 a drive pin; 4 a rotor frame; 5 an FG magnet; 6 a hub magnet; 7 a lubricant sheet; 8 a rotation lever; 9 a flange portion of the rotor frame; 10 a printed board; 11 a hole provided in the flange portion 9 of the rotor frame; 12 a chamfered part of the hole 11 provided in the flange portion of the rotor frame; 13 a stepped portion in the flange portion 9 of the rotor frame; 15 a generating wire element group on the printed broad 10.

As to a motor for disk rotation drive structured as mentioned above, its performance will be explained.

Figure 40:
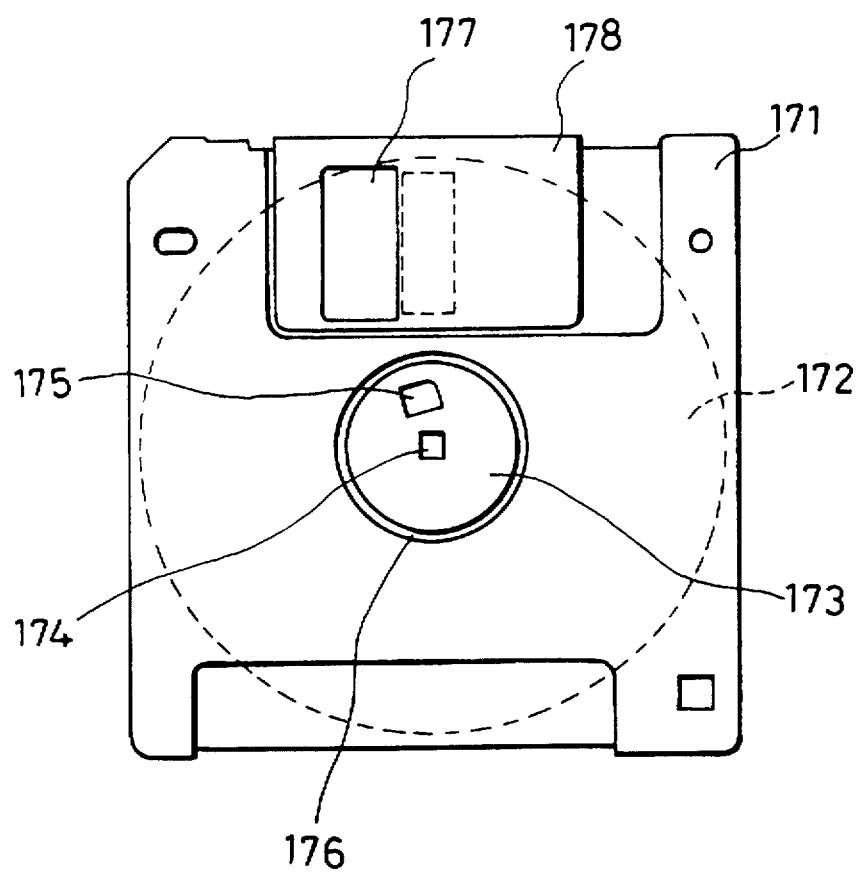
FIG. 40 is a view showing a floppy disk of 3.5 inches.

The principle of drive of a disk (see FIG. 40) is the same as that of a conventional device. The shaft 1 engages with the shaft insertion hole 174 of the flexible disk, and the drive pin 3 engages with the drive pin insertion hole 175 of FIG. 40. Then the disk integrally rotates with the motor. The metal disk hub 173 is attracted by the magnetized hub magnet 6 and rides on the lubricant sheet 7 stuck on the spindle hub 2 and integrally rotates with the rotor frame 4.

The flange portion 9 is provided on the outer periphery of the rotor frame, substantially perpendicularly to the shaft 1. The FG magnet 5 is formed with an integral mold on the face of the flange portion which is opposed to the printed board 10. As shown in FIG. 2, in this flange portion 9, a plurality of the holes 11 for preventing separation of the FG magnet 5 are formed. On the rotor frame top face side of the hole, the chamfered part 12 for preventing separation of the FG magnet is provided. Furthermore, the flange peripheral metal plate on the FG magnet set side is formed into the stepped portion 13, whose FG magnet set side portion protrudes longer than the rotor frame top face side portion. The stepped portion 13 is embraced by the FG magnet from its outer periphery 14 in a manner that the FG magnet does not protrude from the flange face on the rotor frame top face side; and thus the FG magnet is prevented from its separation.

In several positions of the rotor frame corresponding to the hub magnet position, a plurality of holes 16 are provided for preventing separation of an integrally molded magnet, and the hub magnet 6 and the FG magnet 5 can be integrally molded on the rotor frame simultaneously. By integrally molding the hub magnet 6, the thickness of the hub magnet is controlled by 4 metal mold and thus becomes uniform.

Thereby, variation of the distance from the hub magnet face to the disk hub face becomes small, and hence the attractive force of the disk hub becomes constant, and furthermore the hub magnet face becomes paralleled with the disk hub face. Therefore, balance of the disk hub attraction is stable and chucking of a disk becomes stable.

[Embodiment 2]

A second embodiment of the present invention will be explained.

Figure 3:
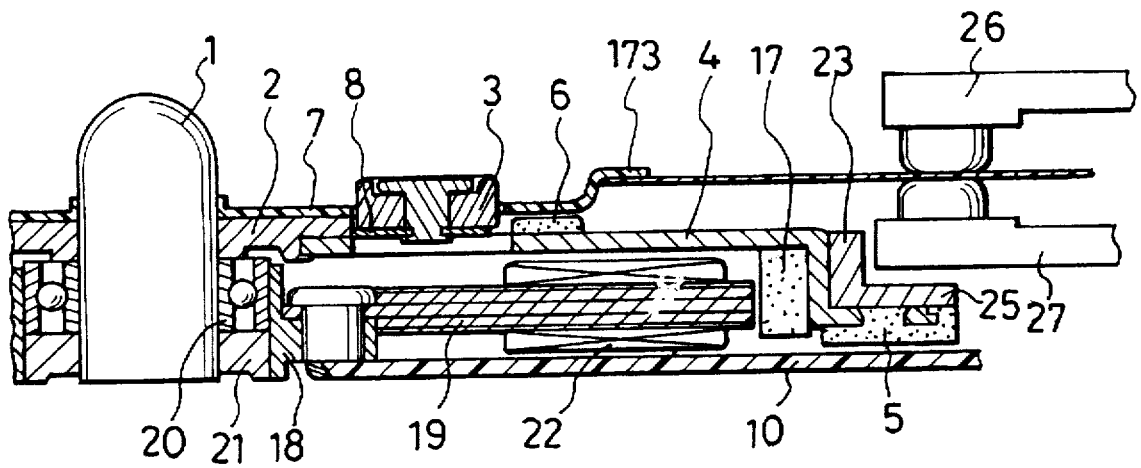
FIG. 3 is a sectional view showing a motor for floppy disk device of one embodiment of the invention.
Figure 4:
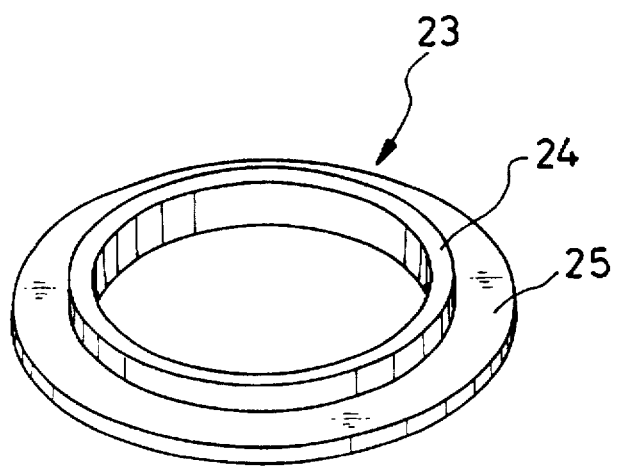
FIG. 4 is a perspective view showing an inertia ring of one embodiment the invention.

FIG. 3 is a sectional view showing a motor for disk rotation drive of one embodiment of claim 3 of the invention. FIG. 4 is a perspective view showing an inertia ring of one embodiment of claim 3 of the invention.

In FIGS. 3 and 4, a reference numeral 1 indicates a shaft; 2 a spindle hub; 3 a drive pin; 4 a rotor frame; 5 an FG magnet; 6 a hub magnet; 8 a rotation lever; 9 a flange portion of the rotor frame; 10 a printed board; 17 a drive magnet; 18 a bearing housing; 19 a core; 20 a ball bearing; 21 an oil impregnated metal; 22 a coil; 23 an inertia ring; 24 a cylinder portion of the inertia ring 23; 25 a flange portion of the inertia ring 23; 26 an upper head; 27 lower head.

FIG. 3 is similar to FIG. 1, and shows a state wherein its inertia ring is attached to the motor and the disk is chucked. Reference numerals 1–6 and 8–10 of FIG. 3 designate the corresponding ones to that of FIG. 1.

As to the motor for disk rotation drive structured as mentioned above, its operation will be explained.

The principle of driving a disk (see FIG. 40) is the same as that of a conventional device, and thus its explanation is omitted here.

Figure 41:
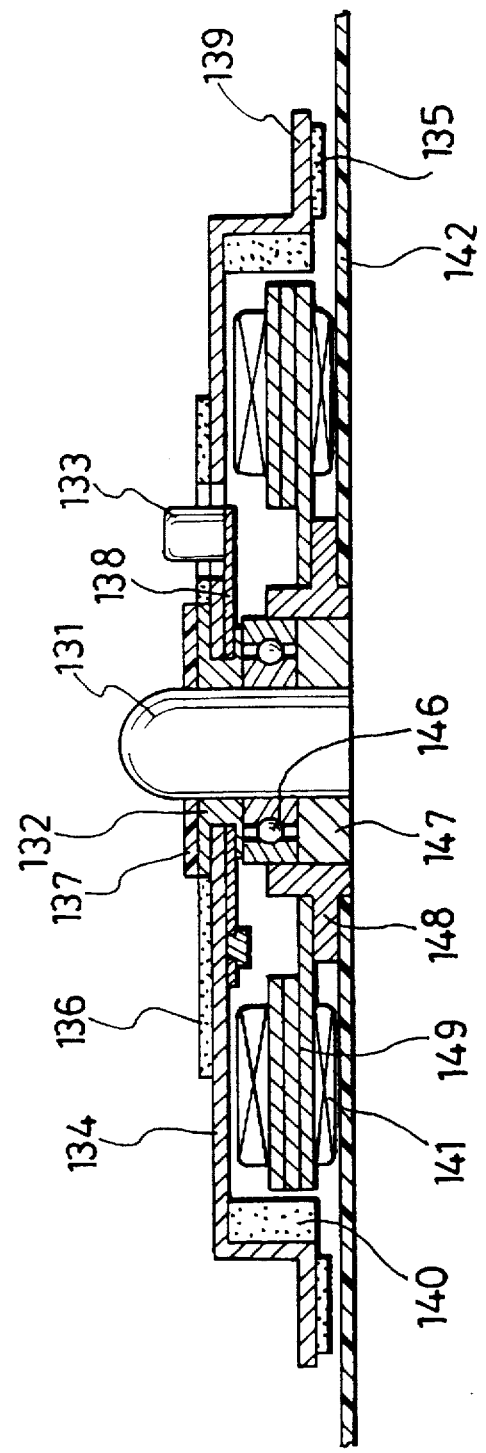
FIG. 41 is a sectional view showing a conventional motor for disk rotation drive.
Figure 42:
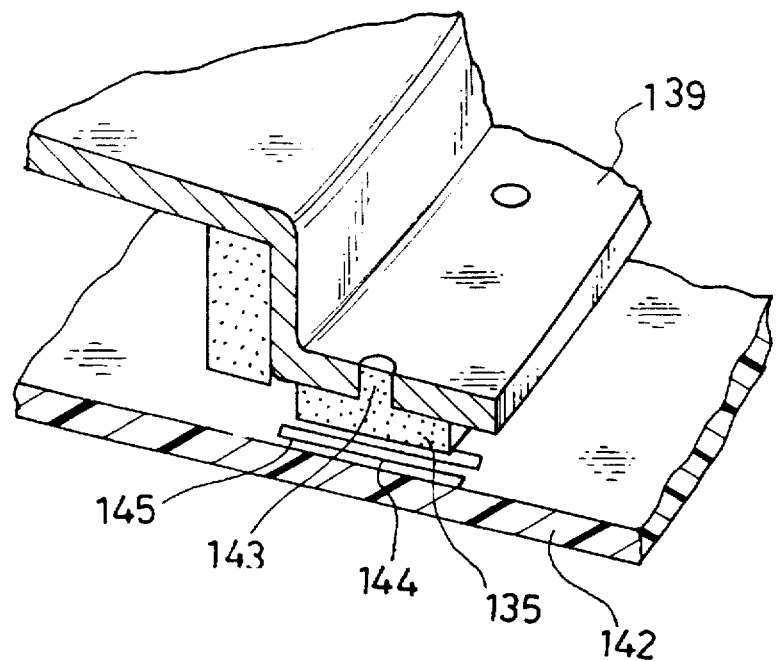
FIG. 42 is a sectional perspective illustration showing a conventional FG magnet portion integrally formed.
Figure 43:
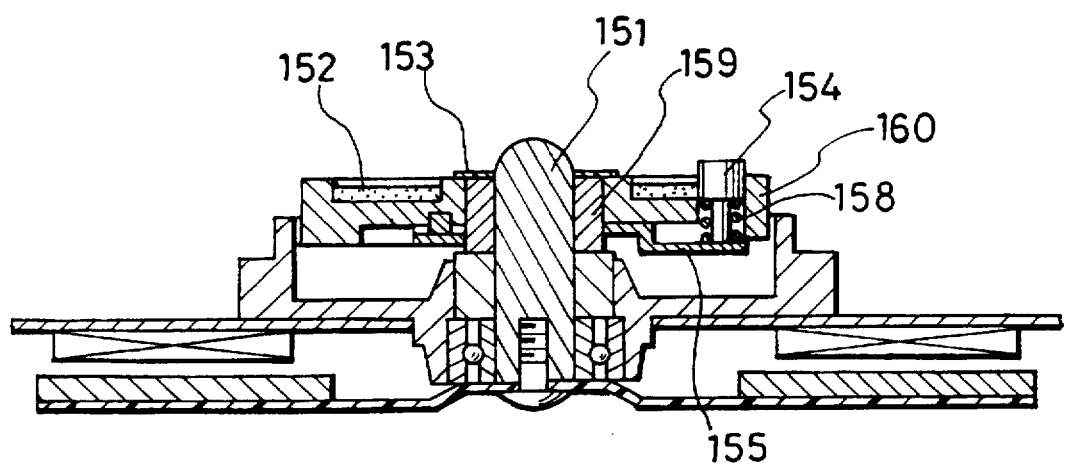
FIG. 43 is a sectional view showing a conventional motor for disk rotation drive.
Figure 44:
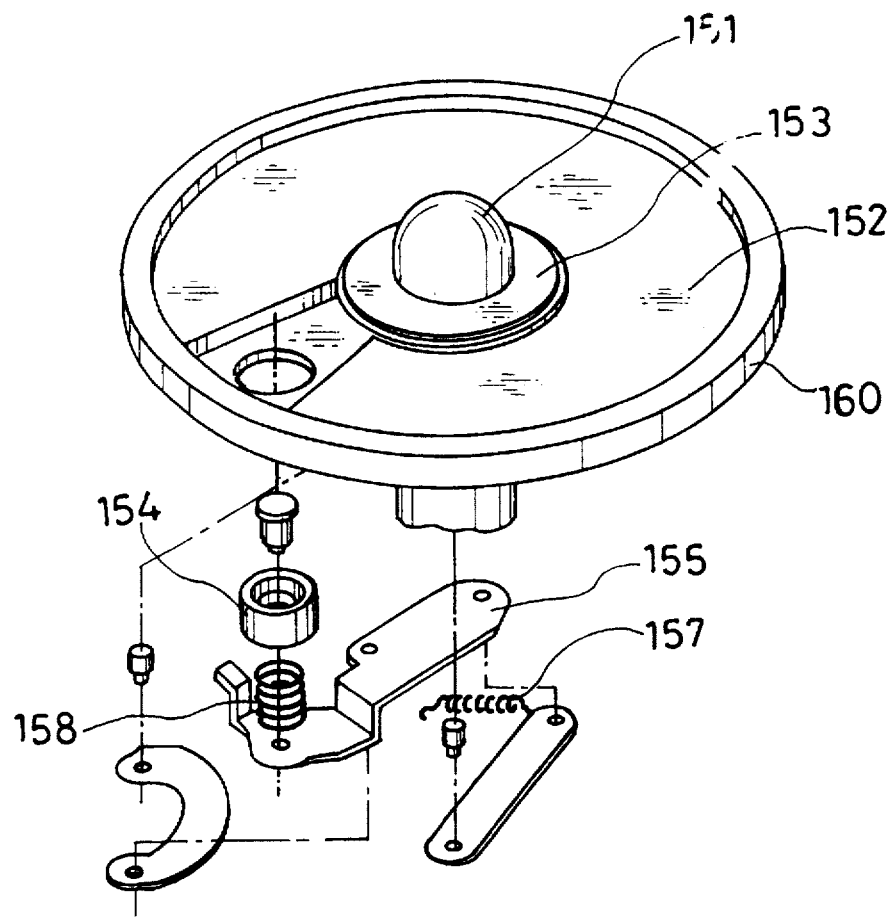
FIG. 44 is a perspective assembling view showing a structure of a conventional hub which chucks a disk.
Figure 45:
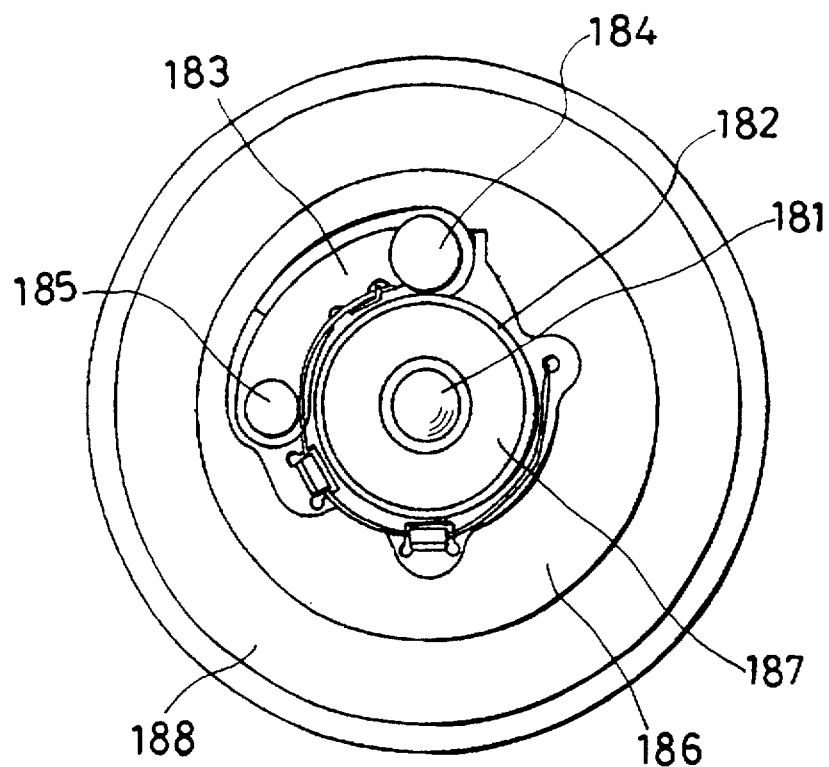
FIG. 45 is a view showing a structure of a conventional hub which chucks a disk.
Figure 46:
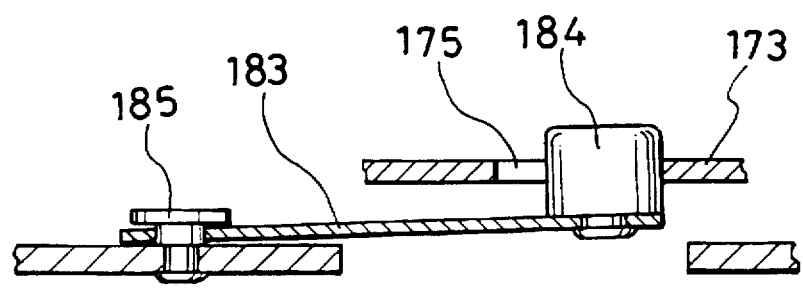
FIG. 46 is an illustration showing floating of a conventional hub which chucks a disk.
Figure 47A:
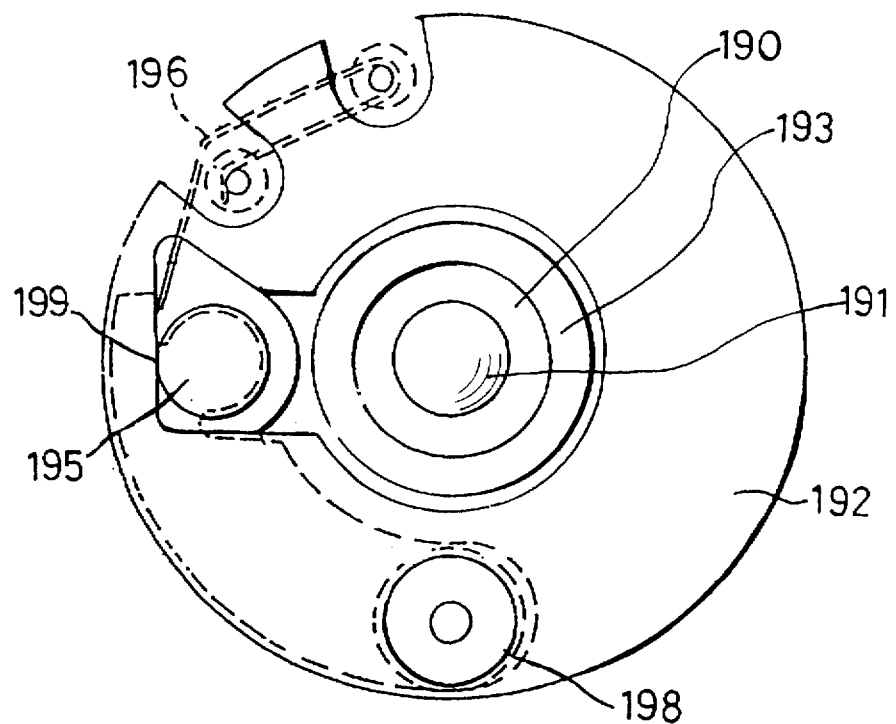
FIG. 47 is a view showing a conventional motor for disk rotation drive.
Figure 47B:
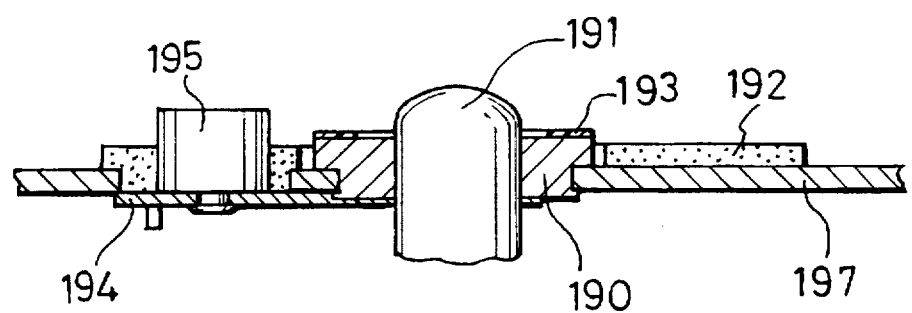
Figure 48A:
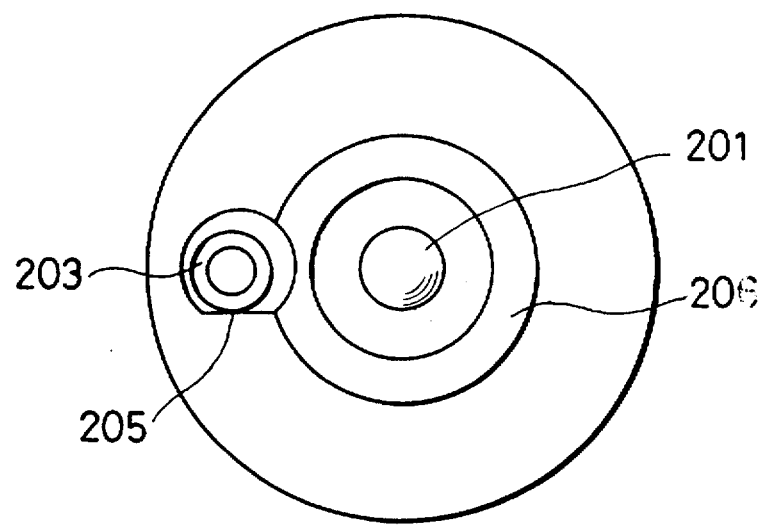
FIG. 48 is a view showing a conventional motor for disk rotation drive.
Figure 48B:
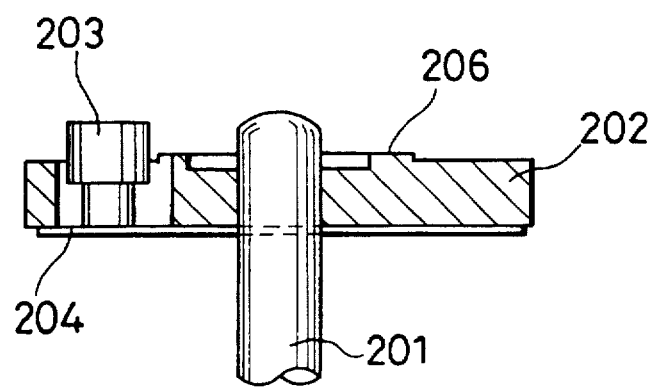
Figure 49:
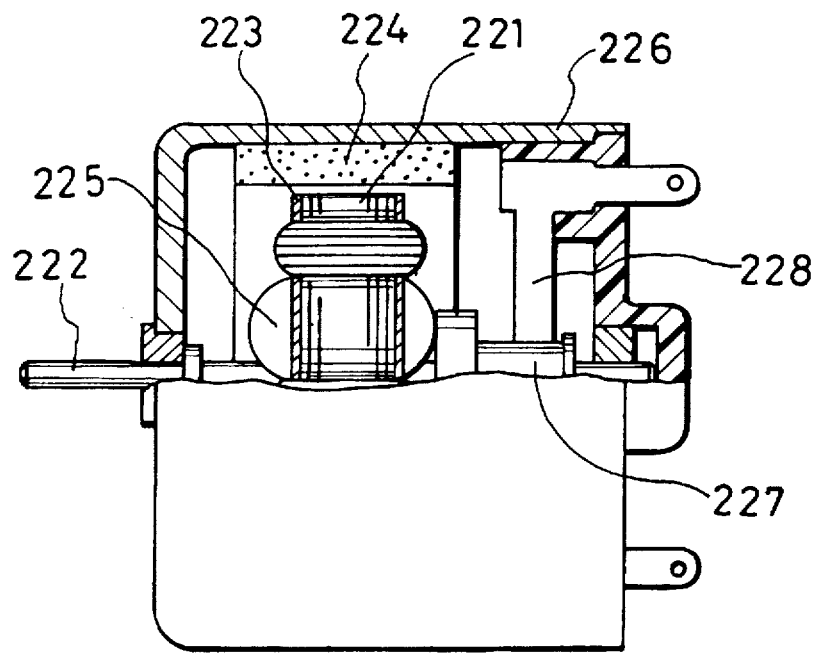
FIG. 49 is a view showing a structure of a conventional motor with brush.
Figure 50:
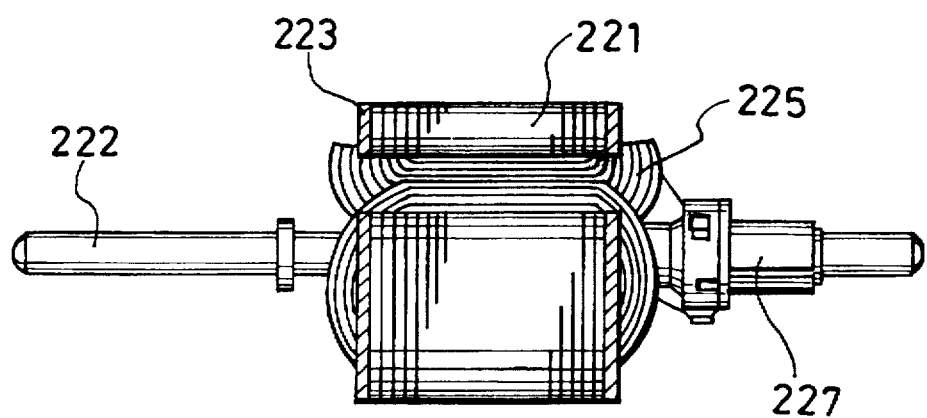
FIG. 50 is a view showing an armature winding assembly of a conventional motor.
Figure 51:
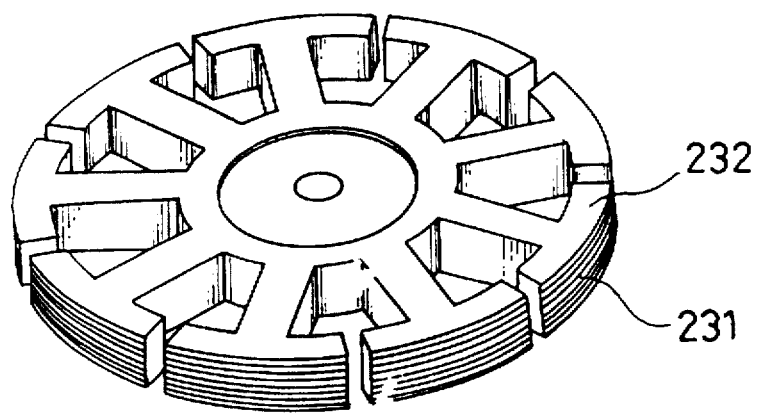
FIG. 51 is a view showing a motor core which is integrally formed with resin.
Figure 52:
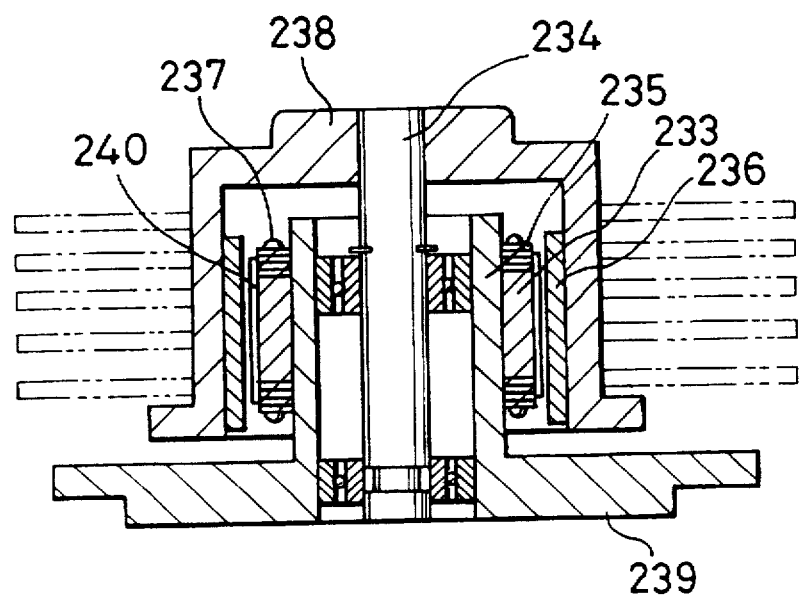
FIG. 52 is a sectional view showing a conventional motor for HDD.

The stator portion is similar to the prior example of FIG. 41 and its explanation is omitted.

The ball oil-imp 20 and the sintered oil-impregnated metal 21 are fixed to a bearing housing 18, which is attached and fixed to the printed board 10. The shaft 1 is inserted into the inner peripheries of both the bearings and rotatably supported by the bearings. The above-mentioned shaft 1 is fixed to the rotor frame 4 via the spindle hub 2 coated with lubricant material. On the inner face of the hanging down portion of the above mentioned cup shape rotor 4, the drive magnet 17 is fixed, and on the flange portion 9 formed by bending substantially at right angle the open end face of he rotor frame 4, the FG magnet 5 is integrally molded. The frequency generation magnetic pole is magnetized on the face of the FG magnet 5 and then an FG signal is obtained from the generating wire disposed opposite to the face of frequency generation magnetization (hereinafter described FG magnetization) face of the frequency generation pole; and the motor is controlled by the FG signal.

The disk is pinched by the upper head 26 and the lower head 27 and rotates there. FIG. 3 shows that the heads are on the most inner periphery of disk writing. The inertia ring 23 has a cylinder portion 24 of a larger inner diameter than the rotor frame outer diameter and a flange portion 25 of almost the same diameter as that of the FG magnet portion. By providing such inertia ring 23 on the rotor frame at hangdown outer periphery in a clearance between the rotor frame 4 and the lower head 27, the rotation inertia of the rotor can be increased. The inertia ring 23 is made of iron, and hence the parts made of iron are abundant between the drive magnet 17 and the rotor frame outer periphery. This serves to prevent inertia decrease, thereby enabling to provide the motor with good control performance and reductions of back yoke effect of the drive magnet 17 and leakage magnetic flux from the rotor frame. Thus the thinning of a motor can be realized.

Figure 5:
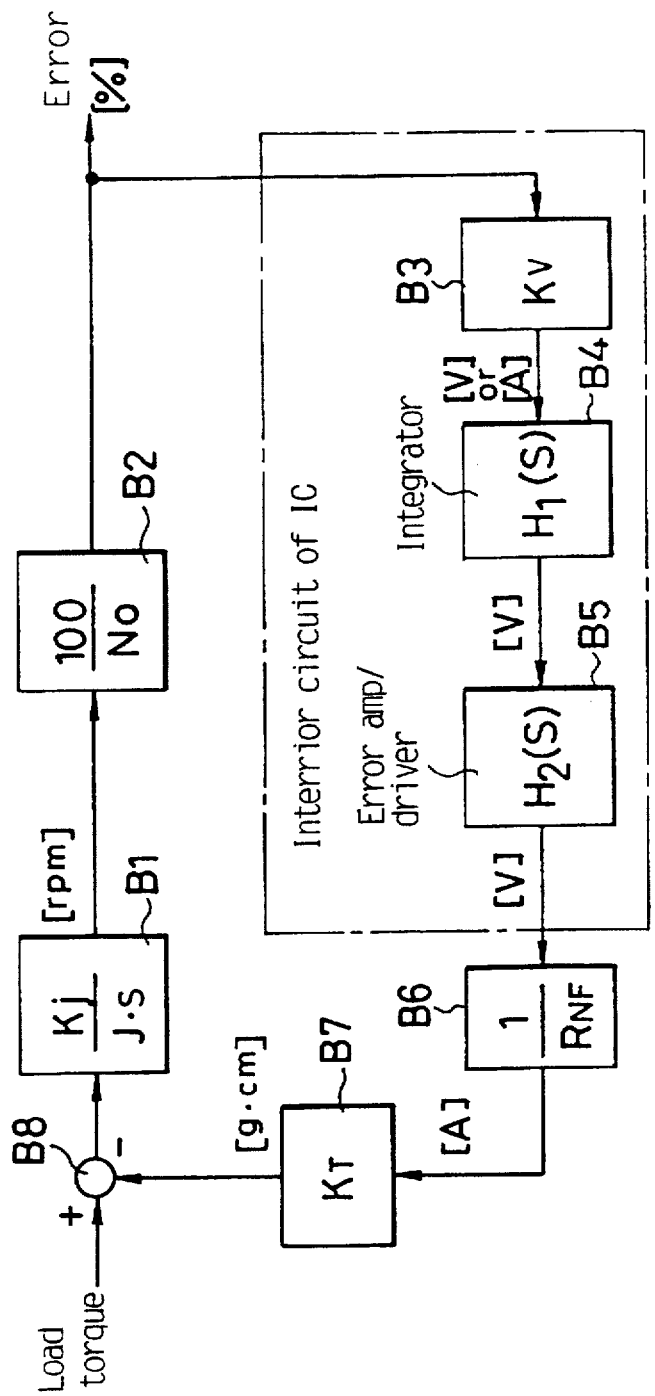
FIG. 5 is a block diagram showing speed control of a brushless motor.

An integrator in a circuit determines stability and a transient characteristic of a control system for a brushless motor. The integrator generally produces a control signal for a motor drive circuit by smoothing and amplifying error pulses from a speed discriminator. A servo-characteristic of the motor is determined by a method of determining of integration constant. FIG. 5 is a block diagram showing speed control of the motor. In FIG. 5, a portion enclosed by a dotted line shows an IC.

Figure 6:
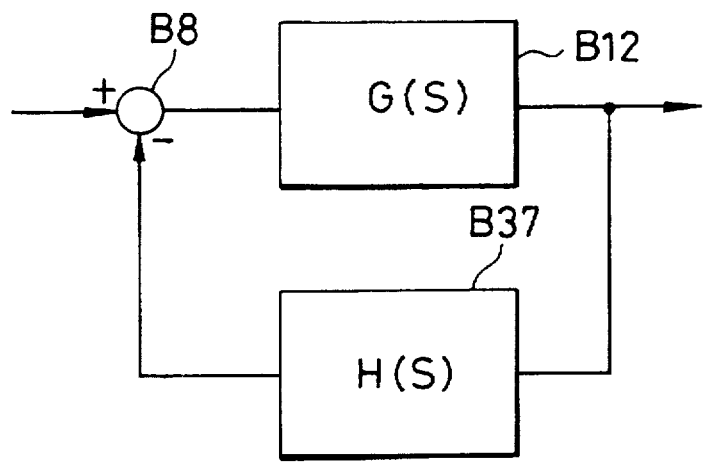
FIG. 6 is a summarized diagram showing speed control of a brushless motor.

FIG. 6 is a theoretically abstracted equivalent circuit of FIG. 5.

Figure 7:
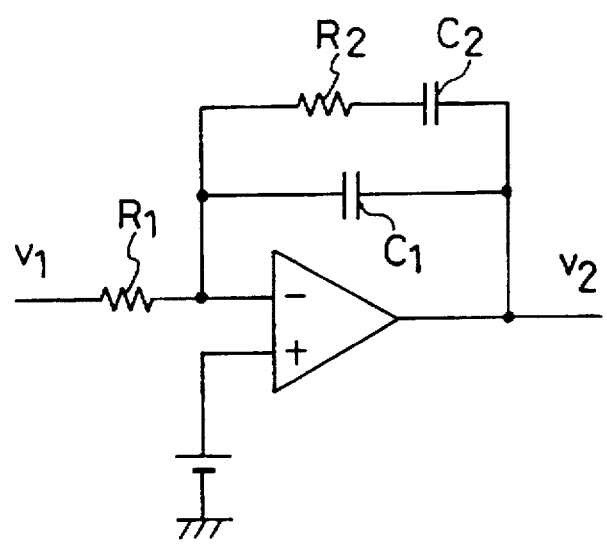
FIG. 7 is an integrator in a brushless motor control circuit.

Transfer functions G(s) and H(s) in FIG. 6 are indicated by $$G(s) = \frac{Kj \cdot 100}{s \cdot J \cdot No} \quad (1)$$

$$H(s) = \frac{Kt \cdot Kv}{Rnf} \cdot H1(s) \cdot H2(s). \quad (2)$$

when the integrator is of voltage type, it is the one shown in FIG. 7, and H1(s) in H(s) is given as:

$$H1(s) = \frac{R2}{R1} \cdot \frac{C2}{C1+C2} \cdot \frac{1+\omega2/S}{1+S/\omega1} \quad (3)$$

$$\text{Where } \omega1 = \frac{1}{\frac{C1 \cdot C2}{C1+C2} R2}$$

$$\omega2 = \frac{1}{C1 \cdot R2}$$

Also, H2(s) in H(s) equivalently results in the following:

$$H2(s) = G = 0.28(4). \quad (4)$$

Therefore H(s) results in $$H(s) = \frac{Kt \cdot Kv \cdot G \cdot R2 \cdot C2}{Rnf \cdot R1(C1+C2)} \cdot \frac{1+\omega2/s}{1+s/\omega1} \quad (5)$$

Figure 8:
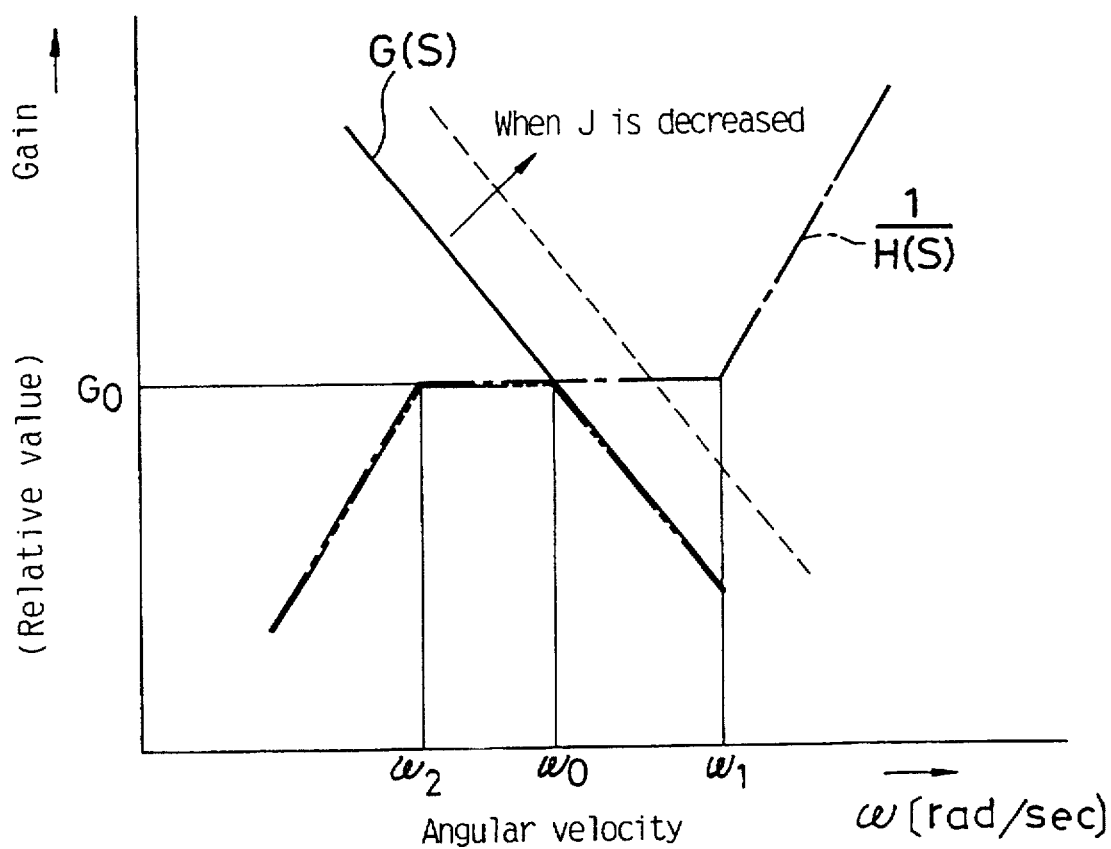
FIG. 8 is a diagram of G(S) and H(S)

A relation between G(s) and H(s), wherein stabilized control performance can be obtained, results in one shown in FIG. 8. When an angular frequency ω0 at an intersection of gain G(s) and gain 1/H(s) is in a range from an angular frequency ω1 of a pole to an angular frequency ω2 for zero point of the integrator, a stabilized control can be obtained.

The servo-characteristic of the motor results in a trapezoid-shaped two-dot chain line (Bode diagram) of FIG. 8. As can be derived from Equation (1), a gain becomes large as a rotation inertia becomes small as shown in FIG. 8. The angular frequency ω0 is made to be between ω1 and ω2, and thus the total gain is increased.

Therefore, in order to reduce an effect of a torque ripple or cogging torque, it is necessary to reduce the torque ripple itself and to increase the rotation inertia as large as possible.

When an inertia ring is attached to a rotor of a miniaturized and thinned motor the gain reduces, and thus the gain of the motor servo-characteristic can be reduced. Therefore, the effect of the torque ripple or cogging torque can be reduced, and thereby the jitter of a motor can be improved.

Figure 9A:
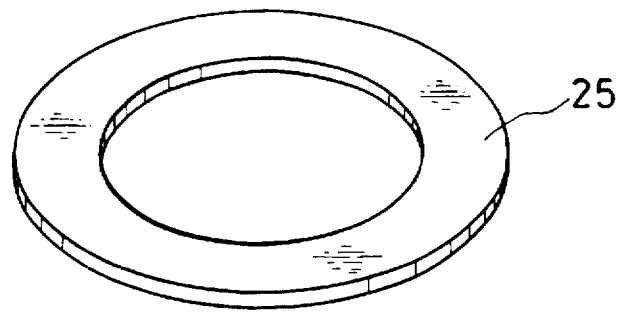
FIG. 9(a) is a view showing an inertia ring of only a flange portion of one embodiment of the invention.
Figure 9B:
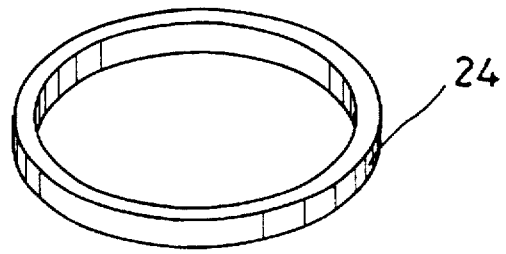
FIG. 9(b) is a view showing an inertia ring of only a cylinder portion of one embodiment of the invention.

By using an inertia ring having only a cylinder portion or an inertia ring having only a flange portion rather than an inertia ring having a cylinder portion and a flange portion, the rotation inertia can be increased. FIG. 9(a) shows an inertia ring having only a cylinder portion, and FIG. 9(a) shows an inertia ring having only a flange portion.

[Embodiment 3]

A third embodiment of the present invention will be explained.

Figure 10:
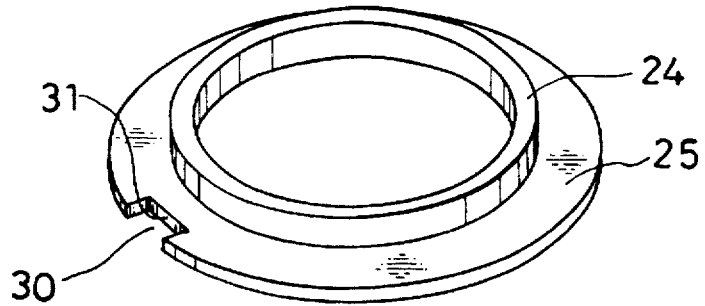
FIG. 10 is a perspective view showing an inertia ring of one embodiment of the invention.
Figure 11:
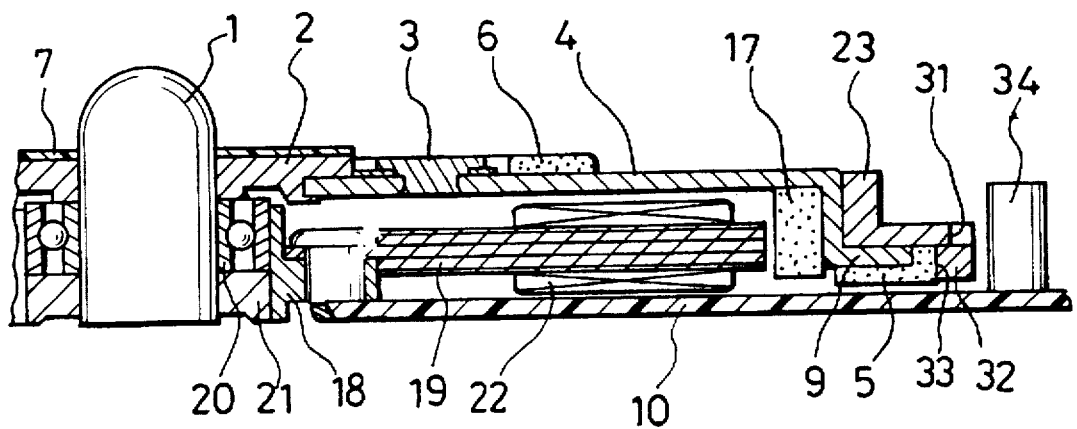
FIG. 11 is a sectional view showing a structure of a brushless motor of one embodiment of the invention.

FIG. 10 is a perspective view showing the third embodiment of the invention, that is, an inertia ring partially provided with a cutout. FIG. 11 is a sectional view showing a motor for disk rotation drive which uses the inertia ring having the cutout. In FIGS. 10 and 11, a reference numeral 1 indicates a shaft; 2 a spindle hub; 4 a rotor frame; 5 an FG magnet; 9 a flange portion of the outer frame; 10 a printed board; 17 a drive magnet; 18 a bearing housing; 19 a core; 20 a ball bearing; 21 an oil impregnated metal; 22 a coil; 23 an inertia ring; 24 a cylinder portion of the inertia ring 23; 25 a flange portion of the inertia ring 23; 30 a cutout of the flange portion of the inertia ring 23; 31 a flange inner face of the cutout 30; 32 a magnet for position detection (hereinafter described a PG magnet); 33 an FG magnet face for attaching the PG magnet; 34 a sensor for position detection (hereinafter described a PG sensor).

FIG. 11 is similar to FIG. 3, but different in that the motor inertia ring has the cutout and the inertia ring is fixed to the rotor frame, meeting the cutout to the PG magnet. FIG. 11 shows a state that a disk is not clucked. Reference numerals 1, 2, 4, 5, 9, 10, and 17 to 25 in FIG. 11 designate corresponding parts to those of FIG. 3.

As to the motor for disk rotation drive structured as mentioned above, its performance will be explained.

The PG magnet 32 is fixed to a position of the FG magnet outermost periphery corresponding to the cutout 30 of the inertia ring 23. A rotor position is detected by the PG 34 fixed to the printed board 10 every time the rotor rotates by one turn. On the basis of the detected signal, information is read from or written into the disk. By providing the cutout 30, the magnetic flux from the PG magnet leaks toward the side of the inertia ring and reaches a wide range of the PG sensor, thus sufficient sensor output can be obtained.

Moreover, by determining a position of the inside face 31 of the cutout 30 to be outside the FG magnet face 33 on which the PG magnet is fixed, intrusion of the magnetic flux from the PG magnet into the head can be alleviated, thereby controlling the amount of the magnetic flux from the PG magnet. Furthermore, when fixing the PG magnet after installing and fixing the inertia ring 23 to the rotor frame 4, if there is a lug of the cutout which makes the position of the inside face 31 outside that of the face 33, vertical positioning of the PG magnet can be done by using this lug, thus stabilized PG signal can be obtained.

[Embodiment 4]

A fourth embodiment of the invention will be explained.

Figure 12:
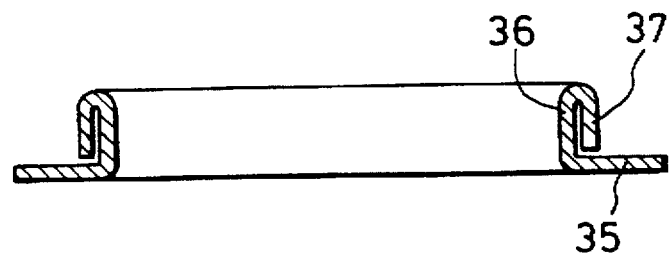
FIG. 12 is a sectional view showing an inertia ring of one embodiment of the invention.

FIG. 12 is a sectional view showing an inertia ring of one embodiment of the invention.

FIG. 12 shows a inertia ring in which a cylindrical cylinder portion 36 is formed by bending, perpendicularly to a face of a flange portion 35, the inner periphery of the ring shape flange portion 35; and a cylinder portion 37 is formed on the outer periphery of the cylinder portion 36 by outward folding the end portion of the cylinder portion 36. Thereby a double structure cylinder portion is formed.

In this embodiment, the cylinder portion and the flange portion each having a different thickness are formed by squeezing material, while in the embodiment of this invention the thickness of the cylinder portion are made different only through bending work. Thus an inertia ring which increases the inertia of a motor can be made by a small press.

[Embodiment 5]

A fifth embodiment of the invention will be explained.

Figure 13:
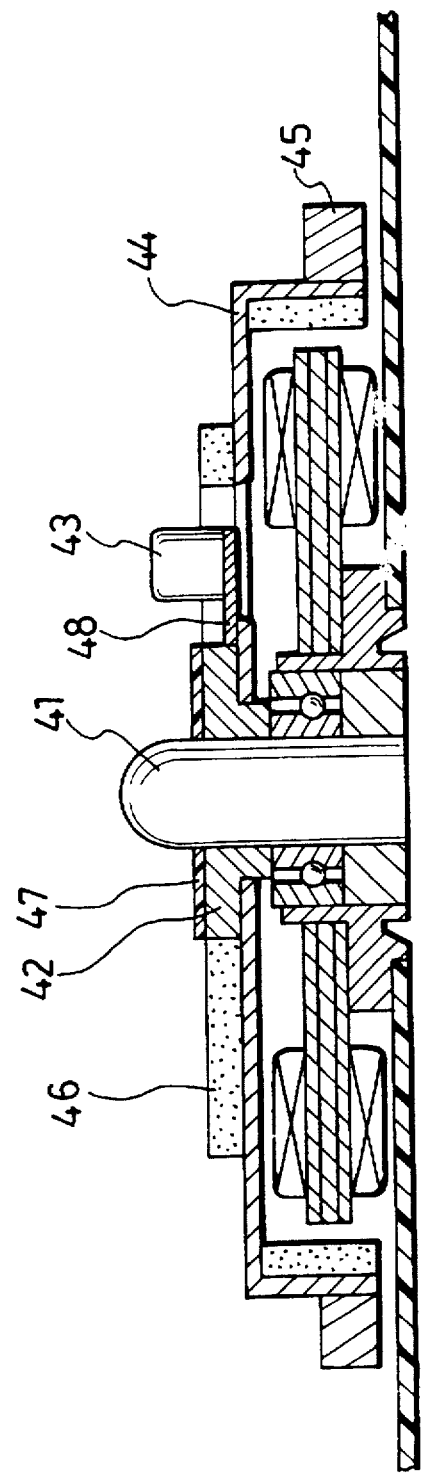
FIG. 13 is a sectional view showing a disk rotation drive device of one embodiment of the invention.

FIG. 13 is a sectional view showing a motor for disk rotation drive of the fifth embodiment of claim 6 of the invention. FIG. 14 is a view showing a hub structure of a motor for disk rotation drive of one embodiment of claim 6 of the invention. In FIGS. 13 and 14, a reference numeral 41 indicates a shaft; 42 a spindle hub; 43 a drive pin; 44 a rotor frame; 45 an FG magnet; 46 a hub magnet; 47 a lubricant sheet; 48 a rotation lever made of elastic material; 49 an activating coil spring for activating rotation; 50 a pillar; 51 a hook for a spring made by cutting and raising a part of the rotor frame 44; 52 a hook for a spring of the rotation lever 48.

A disk (see FIG. 40) rotation drive motor have the motor shaft 41 whose end engages with a shaft insertion hole 174 provided in a center of a metal disk hub 173 and the drive pin 43 which engages with a drive pin insertion hole 175 provided in an eccentric position to a center of a disk hub 173. The rotor frame 44, which integrally rotates via the spindle hub 42 with the shaft 41, is attached to the end of the above shaft 41. On a disk carrying side face of this rotor frame 44, the magnetized hub magnet 46 is provided which attracts a disk hub 173.

The rotation lever 48, which is made of elastic material and curve-formed so as to surround the spindle hub 42, is supported so that it can rotate around the pillar 50 as a supporting point, the pillar 50 being fixed on the outer face of the rotor frame 44. At one end of this rotation lever 48, the drive pin 43 is fixed. At the other end of the rotation lever 48, which extends in the reverse direction to the drive pin 43, the hook 52 for the spring is provided to hold one end of the rotation activating coil spring 49. The other end of the coil spring 49 is hung on the spring-holding hook 51 formed by cutting and raising a part of the rotor frame 44, thereby making the drive pin 43 generate rotation activating force. The above coil spring 49 is structured to have a length within the distance range from the outer face of the rotor frame 44 to the disk hub face and a thickness within the thickness (less than 1.0 mm) of the hub magnet 46, which is integrally molded on the rotor frame 44, taking account of an inclination of media hub at the state of chucking.

As to the motor for disk rotation drive structured as mentioned above according to the embodiment of the invention, its performance will be explained.

First, a disk is inserted into a disk rotation drive device, and the disk hub 173 is attracted to the magnetized hub magnet 46 to be supported by the spindle hub 42 on which the lubricant sheet 47 is stuck. Simultaneously the shaft 41 is inserted into and engaged with the shaft insertion hole 175. When a position of the drive pin 43 and a position of the drive pin insertion hole 175 do not meet, the drive pin 43 is depressed by the disk hub attraction force of the hub magnet 46, and contacts with the disk hub in a state that the rotation lever 48 of elastic material is bent. When the motor starts to rotate, the disk becomes still by pinch force of the magnetic heads, and the spindle hub 42 rotates relatively to the disk hub 143. When a position of the drive pin 43 and a position of the drive pin insertion hole 175 meet, the drive pin 43 is inserted into the drive pin insertion hole by elastic return force of the rotation lever 48. At that time, the drive pin 43 contacts with and rolls on the outer crest side of the drive pin insertion hole by the activating force of the coil spring 49 which activates the rotation lever outward. When relative movement between the drive pin 43 and the disk hub 173 becomes zero, the torque of the shaft 41 starts to be transmitted to the disk hub 173 and the disk is rotation-driven.

Here, the rotation activating coil spring 49 can be structured within the thickness of the hub magnet 46 and the disk chucking mechanism also can be structured within the thickness of the hub magnet 46, therefore a thin type rotation drive device can be produced.

[Embodiment 6]

A sixth embodiment of the invention will be explained.

Figure 15:
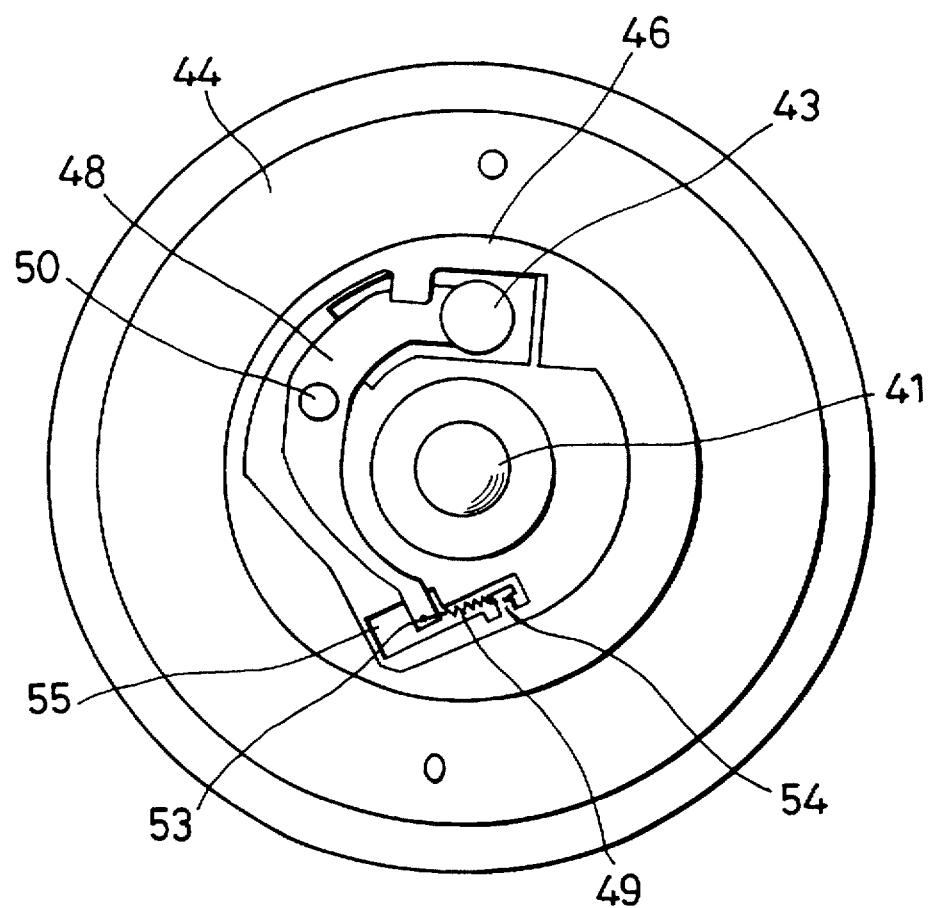
FIG. 15 is a view showing a structure of a hub, which chucks a magnetic disk, of one embodiment of the invention.

FIG. 15 is a view showing a hub structure of a motor for disk rotation drive of the sixth embodiment of the invention.

In FIG. 15, a reference numeral 41 denotes a shaft; 43 a drive pin; 44 a rotor frame; 46 a hub magnet; 48 a rotation lever made of elastic material; 49 an activating coil spring for rotation activating; 50 a pillar; 53 a spring hanging hole at the end of the rotation lever; 54 a spring hook of the rotor frame; 55 a coil spring hole.

In FIG. 15, similar to the case of FIG. 14, the rotation lever 48 is supported by the pillar 50 provided on the rotor frame 44 outer face. The drive pin 43 is fixed to the end of this rotation lever 48. One end of the rotation activating coil spring 49 is held on the spring hanging hole 53 at the end of the rotation lever 48, which extends in the reverse direction of the drive pin 43 to the pillar 50. The other end of the coil spring 49 is held on the spring hook 54 of the rotor frame 44, thereby making the drive pin 43 generate rotation activating force.

Here, in the rotor frame 44 portion opposing the rotation lever and portion which contains the coil spring 49 and the spring hanging hole 53, the coil spring hole 55 is provided such that the coil spring 49 does not contact with the rotor frame outer face, and the coil spring hook 54 is formed near the opposing portion to the rotation lever end portion in the coil spring hole 55. In such a way, the coil spring 49 is in the coil spring hole 55, and thus the rotation activating coil spring 49 is set within a total thickness summing the thickness of the hub magnet 46, which is integrally molded on the rotor frame 44, and the thickness of the rotor frame plate.

As mentioned above, according to the embodiment of the present invention, the thickness of the rotor frame plate can be effectively utilized. Thus even when the thickness of the hub magnet is thin, a highly reliable, inexpensive and thin motor for disk rotation drive can be produced.

[Embodiment 7]

A seventh embodiment of the invention will be explained.

Figure 16:
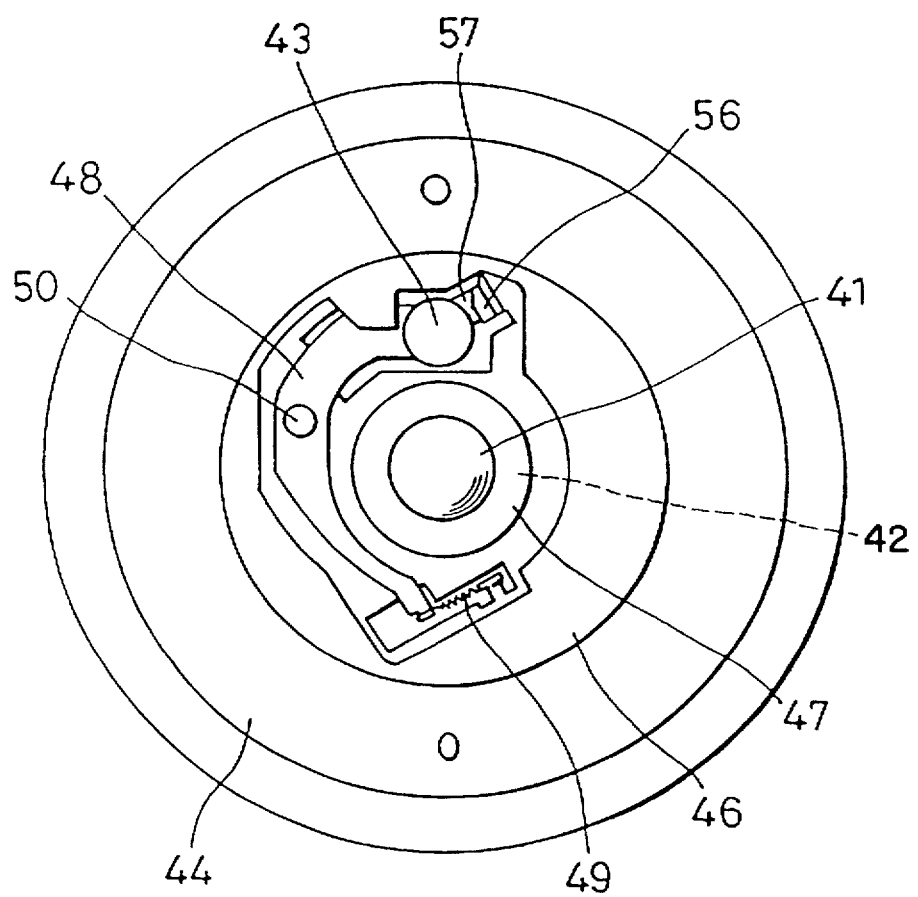
FIG. 16 is a view showing a structure of a hub, which chucks a disk, of one embodiment of the invention.
Figure 17:
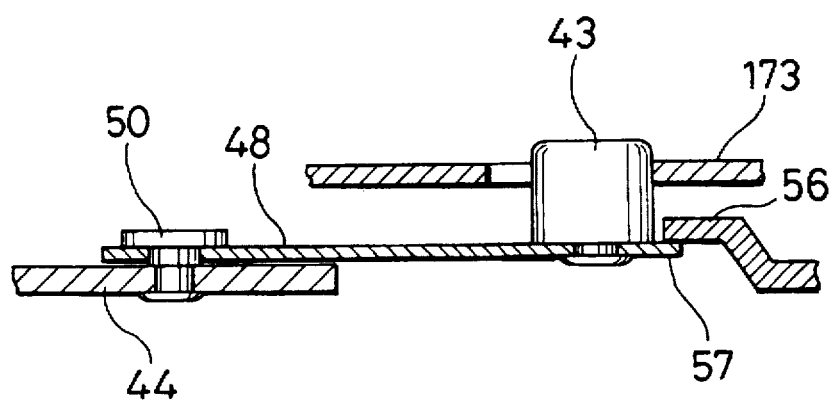
FIG. 17 is an illustration showing that a protruding portion of one embodiment of the invention contacts a rotor frame at disk chucking.

FIG. 16 is a view showing a hub structure which contacts a protruding portion at a rotation lever end of a motor for disk rotation drive with a rotor frame of a motor of the present invention. FIG. 17 is a sectional illustration showing a state that the hub structure contacts the protruding portion of the rotation lever with a hook of the rotor frame.

In FIGS. 16 and 17, a reference numeral 41 denotes a shaft; 42 a spindle hub made of brass-based metal; 43 a drive pin; 44 a rotor frame; 46 a hub magnet; 47 a lubricant sheet; 48 a rotation lever made of elastic material; 49 an activating coil spring for rotation activation; 50 a pillar; 56 a hook portion provided by cutting and raising the rotor frame 44 portion near the drive pin 43; 57 a protruding portion of the rotation lever. As shown in FIG. 17, the feature of the structure is that the protruding portion 57 contacts with the hook portion 56 of the rotor frame at the rotation lever end near the drive pin.

As to the motor for disk rotation drive structured as mentioned above in accordance with the embodiment of the invention, its performance will be explained.

First, a disk (see FIG. 40) is inserted into a disk drive device, and the disk hub 173 is attracted by the magnetized resin or rubber made hub magnet 46 as the disk is installed and attracted on the lubricant sheet 47 adhered to the spindle hub 42. At the same time the shaft 41 inserted into the motor shaft insertion hole 174 of the disk hub 173. When a position of the drive pin insertion hole 175 and a position of the drive pin 43 do not meet, the drive pin 43 is pushed, in the direction of the shaft axis, by means of a mutual attractive force exerted between the hub magnet 46 and the disk hub 173, thereby to hide it in the interior of the motor. At the time, the rotation lever 48 bends toward the motor side (downward in FIG. 17). When the motor shaft 41 starts to rotate, the disk becomes still, due to pinch force of the magnetic heads, and the spindle hub 42 rotates relatively to the disk hub 173. When a position of the drive pin 43 and a position of the drive pin insertion hole 175 of the disk hub 173 meet, the above drive pin 43 is inserted into the drive pin insertion hole by elastic return force, of the rotation lever 48, toward the disk hub. The protruding portion 57 of the rotation lever and contacts the hook portion 56 of the rotor frame 44 by elastic return force of the rotation lever 48 which was bent and resumes its original state, that is, the state before insertion of the disk. When the motor shaft 41 continues to rotate, the drive pin 43 contacts and rolls or slides on the outer crest face of the drive pin insertion hole of the disk hub by the activating coil spring 49 provided between the other end of the rotation lever 48 and the spring hook of the rotor frame. When the drive pin 43 engages with the insertion hole in a manner that relative movement between the disk hub and the drive pin 43 becomes zero, the motor torque is transmitted to the disk hub and the disk integrally rotates with the motor.

[Embodiment 8]

An eighth embodiment of the present invention will be explained.

Figure 18:
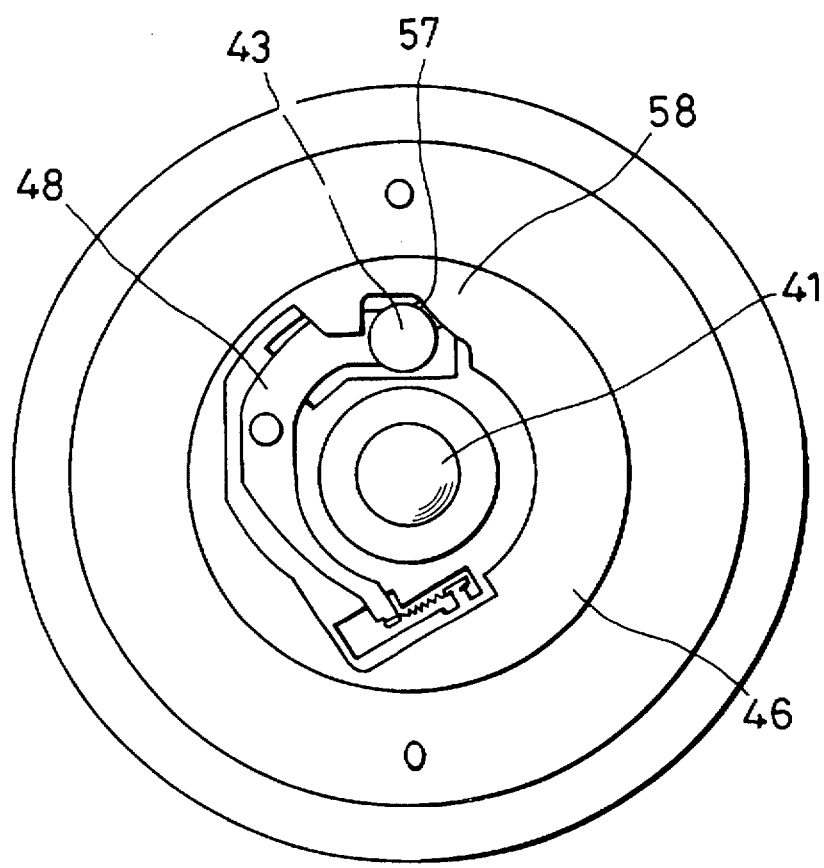
FIG. 18 is a view showing a structure of a hub, which chucks a disk, of one embodiment of the invention.

FIG. 18 is a view showing a hub structure which contacts a protruding portion at a rotation lever end of a motor for disk rotation drive with a hub magnet of the motor of the embodiment. In FIG. 18, a reference numeral 58 denotes a stopper portion of a hub magnet which contacts a protruding portion 57 of a rotation lever 48. Thereby the same effect can be obtained as that of the embodiment of claim 8 in FIG. 16.

As mentioned above, according to the embodiment, the rotation lever 48 is provided with the protruding portion 57. By contacting this protruding portion 57 with the hook 56 of the rotor frame or the stopper 58 of the hub magnet, floating or bending of the rotation lever at chucking can be eliminated.

[Embodiment 9]

A ninth embodiment of the invention will be explained.

Figure 19:
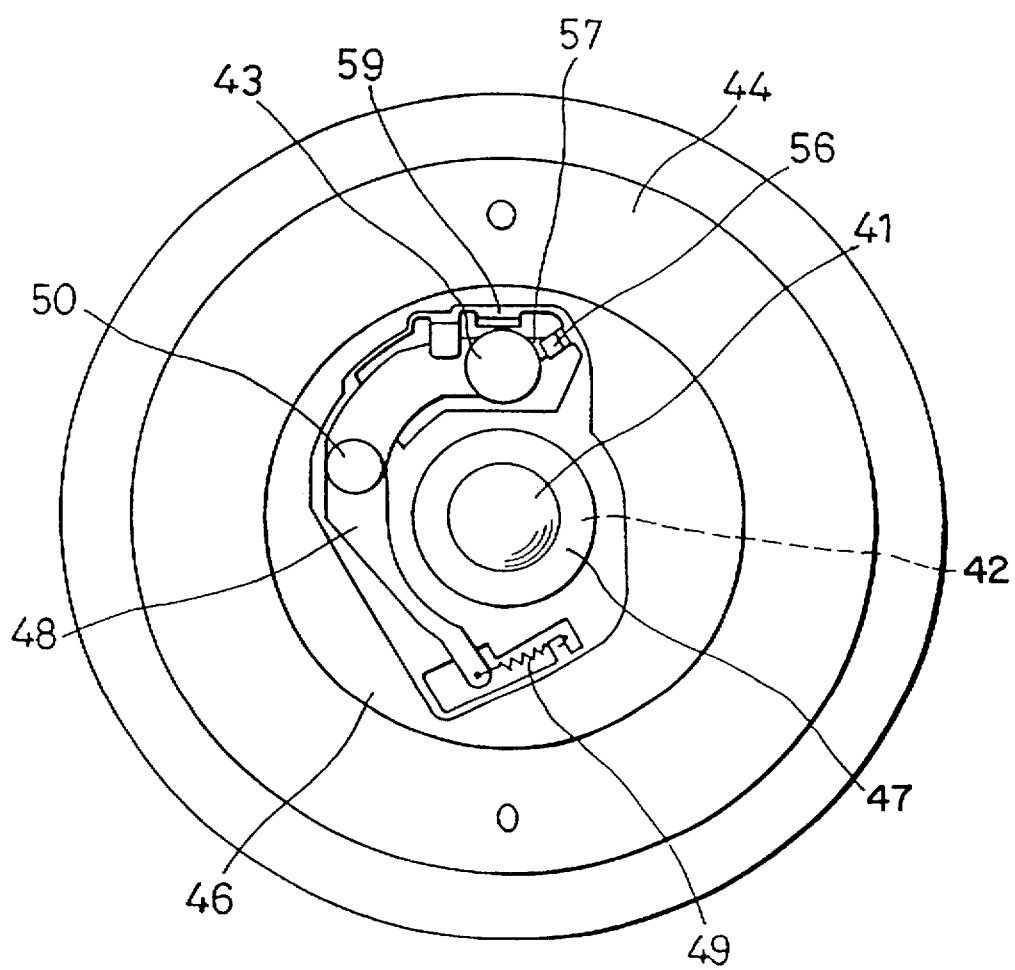
FIG. 19 is a view showing a structure of a hub which chucks a disk of one embodiment of the invention.
Figure 20A:
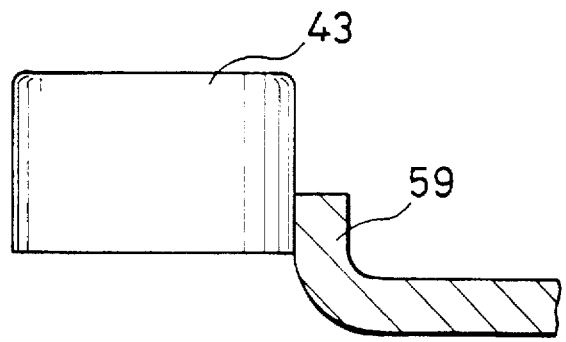
FIG. 20(a) is an illustration showing that a drive pin contacts a cut and raised portion of a rotor frame in the case that a rotation lever is not bent.
Figure 20B:
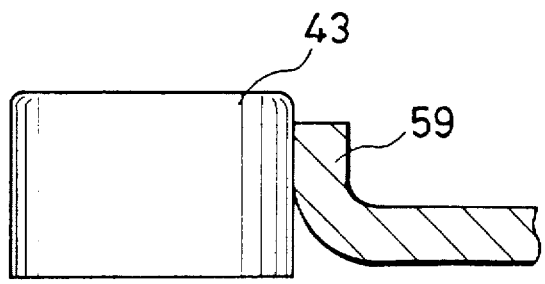
FIG. 20(b) is an illustration showing that a drive pin contacts a cut and raised portion of a rotor frame in the case that a rotation lever is bent.

FIG. 19 is a view showing a hub structure which contacts a drive pin at a rotation lever and of a motor for disk rotation drive with a cut and raised portion of a rotor frame of the motor of one embodiment. FIGS. 20(a)–20(b) are illustrations showing a state wherein the drive pin contacts the cut and raised portion of the rotor frame. FIG. 20(a) shows that the rotation lever is not bent, while FIG. 20(b) shows that the rotation lever is bent.

In FIGS. 19 and 20(a)–20(b), a reference numeral 41 indicates a shaft; 42 a spindle hub; 43 a drive pin; 44 a rotor frame; 46 a hub magnet; 47 a lubricant sheet; 48 a rotation lever made of elastic material; 49 an activating coil spring for rotation activating; 50 a pillar; 56 a hook portion provided by cutting and raising the motor frame 44 portion near the drive pin 43; 57 a protruding portion of the rotation lever; 59 a cut and raised portion of the rotor frame.

As to the motor for disk rotation drive structured as mentioned above according to the embodiment of the invention, its performance will be explained.

First, a disk (see FIG. 40) is inserted into a disk drive device, and the disk hub 173 is attracted by the magnetized resin or rubber made hub magnet 46 as the disk is installed and attracted on the spindle hub 42 face on which the lubricant sheet is stuck. At the time the shaft 41 is inserted into the shaft insertion hole 174 of the disk hub. As shown in FIG. 20(a), the drive pin 43 contacts the cut and raised portion 59 of the rotor frame by a spring force of the activating spring 49 and does not move toward a further outer periphery. On installing the disk, when a position of the drive pin insertion hole 175 and a position of the drive pin 43 do not meet, the drive pin 43 is pushed, in the direction of the shaft axis, by means of a mutual attractive force exerted between the hub magnet 46 and the disk hub 173, thereby to hide it in the interior of the motor. At that time, the rotation lever 48 bends toward the interior of the motor, and drive pin 43 moves to the interior of the motor in a state of contacting with the cut and raised portion 59 of the rotor frame (state of FIG. 20(b)).

When the motor shaft 41 starts to rotate, the disk becomes still due to the pinch force of the magnetic heads, and the spindle hub 42 rotates relative to the disk hub. When a position of the drive pin 43 and a position of the drive pin insertion hole 175 of the disk hub meet, the above drive pin 43 is inserted into the drive pin insertion hole by elastic return force, of the rotation lever 48, toward the disk hub. The protruding portion 57 of the rotation lever end contacts the reverse face to the outer face of the hook portion 56 of the rotor frame 44 by elastic return force of the rotation lever 48, which has been bent and resumes its original state, that is, the state before insertion of the disk. When the motor shaft 41 continues to rotate, the drive pin 43 separates from the cut and raised portion 59 of the rotor frame and contacts and rolls (or slides) on the outer crest face of the drive pin insertion hole of the disk hub by the activating spring 49 provided between the other end of the rotation lever 48 and the spring hook of the rotor frame. When the drive pin 43 engages with the insertion hole in a manner that relative movement between the disk hub and the drive pin 43 becomes zero, the motor torque is transmitted to the disk hub and the disk integrally rotate with the motor.

As mentioned above, according to the present embodiment, the drive pin 43 is at a constant distance from the shaft 41 before chucking; and force exerted on the disk becomes constant at chucking. Thus variation of positioning torque is eliminated and a motor for disk rotation drive capable of stabilized chucking can be produced.

[Embodiment 10]

A tenth embodiment of the invention will be explained.

Figure 21:
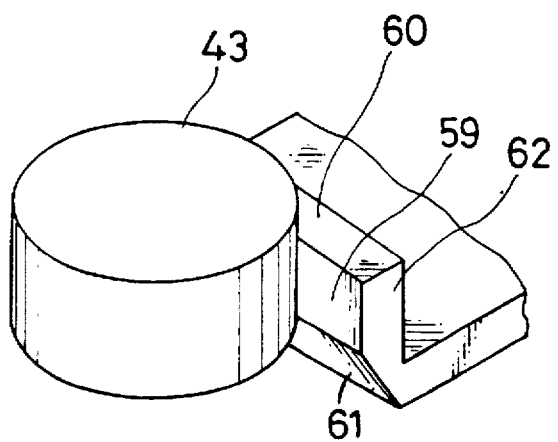
FIG. 21 is a view showing a sloped face of a bent portion outer face of a cut and raised portion, in a disk rotation drive device, according to one embodiment of the invention.

FIG. 21 is an illustration showing a state that a drive pin at a rotation lever end of a motor for disk rotation drive contacts a cut and raised portion of a rotor frame, the motor is the tenth embodiment of the invention.

In FIG. 21, a reference numeral 43 denotes a drive pin fixed to a rotation lever end; 59 the cut and raised portion of the rotor frame; 60 a center portion of the cut and raised portion 59 of the rotor frame; 61 a sloped face of a bent outside of the cut and raised portion 59 of the rotor frame.

When the cut and raised portion 59 made by cutting a part of the rotor frame and bending it at an angle of about 90) is formed by bending, the side portion 62 of the cut and raised portion 59 is higher than the center portion 60 of the portion 59 by means of a press die and a drag; and the height of the raising of the portion 59 is different depending upon a position. The drive pin contacts the raised face of the center portion 60, and thus when the height of raising of the center portion 60 is low, the width of contacting decreases. Thus, in order to secure the contacting width after making the cut and raised portion by bending, by pressing the cut and raised portion from the outer periphery of the bent portion to produce a sloped face 61 which is not on R face on the bent portion outer periphery side, the heights of the center portion 60 and the side portion 62 of the cut and raised portion 59 of the rotor frame are made to fall within a set height.

As mentioned above, according to the present embodiment, the height of the cut and raised face, with the cute drive pin contacts, of the cut and raised portion can be stably secured, and movement of the drive pin 43 to the interior of the motor at chucking can be stably performed.

[Embodiment 11]

An 11th embodiment of the invention will be explained.

Figure 22:
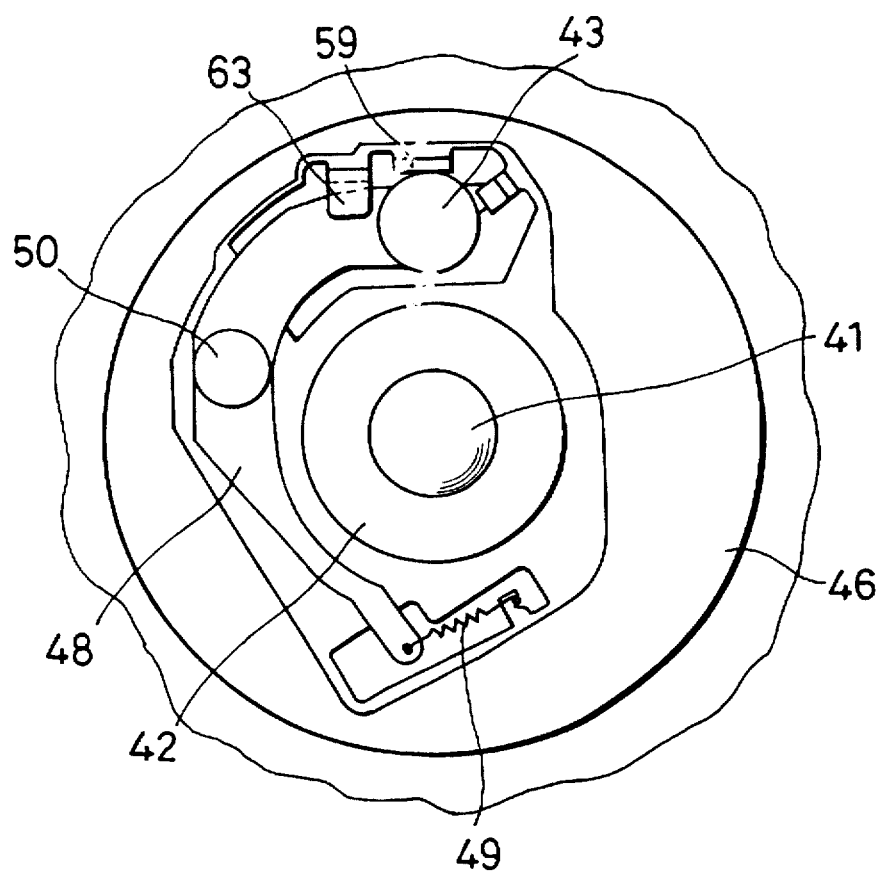
FIG. 22 is a view showing a structure of a hub of one embodiment of the invention.
Figure 23:
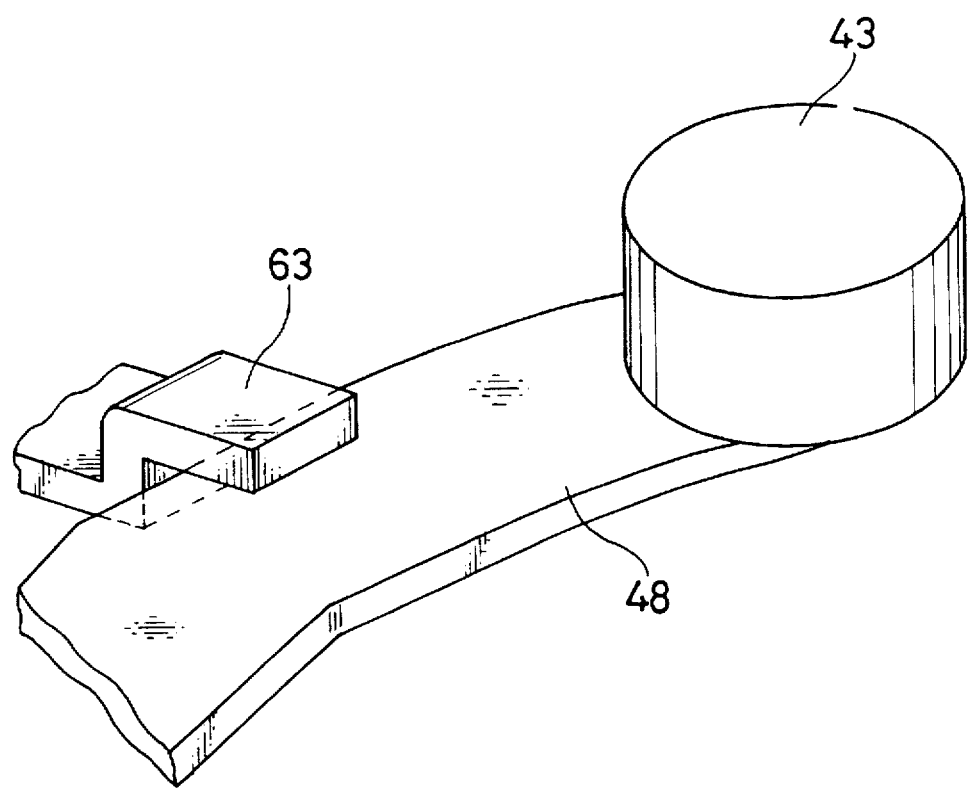
FIG. 23 is an illustration showing that a rotation lever contacts a cut and raised portion of a rotor frame.

FIG. 22 is a view showing a hub structure which contacts a rotation lever of a motor for disk rotation drive with a hook portion of a rotor frame, the motor is an embodiment of the invention. FIG. 23 is a perspective view showing that the rotation lever contacts a cut and raised portion of the rotor frame. The same reference numerals 41, 42, 43, 46, 48, 49, 50, 59 in FIGS. 22 and 23 as that in FIG. 19 of the embodiment of claim 10 indicate the same thing. A reference numeral 63 denotes a hook portion provided by cutting and raising a part of the rotor frame.

As to the motor for disk rotation drive structured as mentioned above, its performance will be explained. The principle of the mechanism that a disk is inserted into a disk drive and chucked and integrally rotated with motor is the same as that of the embodiment of FIG. 19.

However, differences in detail portions between them will be mainly explained.

In a state before installation of a disk (see FIG. 40), the drive pin 43 is contacted with the cut and raised portion 59 of the rotor frame by spring force of the activating spring 49 and prevent from moving toward a further outer periphery. Moreover, the rotation lever 48 is contacted with the reverse side face to the outer face of the cut and raised hook portion 63 provided in the above rotor frame and this restrains the drive pin from moving more upward.

On the disk installation, when a position of the drive pin insertion hole 175 and a position of the drive pin 43 do not meet, the drive pin 43 is pushed in the direction of the shaft axis with the disk hub by attractive force exerted between the hub magnet 46 and the disk hub, thereby to hide in the interior of the motor. At this time, the rotation lever 48 bends toward the motor side, and thus separates from the cut and raised hook portion 63 provided on the rotor frame, thereby to be released from the contacting. In addition, the drive pin 43 is in contact with the cut and raised portion 59.

P When the motor starts to rotate and a position of the drive pin 43 and a position of the drive pin insertion hole of the disk hub meet, the above drive pin 43 is inserted into the drive pin insertion hole by elastic return force, of the rotation lever 48, toward the disk hub. Then, the bent rotation lever 48 contacts the hook portion 63 of the rotor frame by its elastic return force and restrains the drive pin 43 from its upward movement and resumes the original state, that is, the state before disk insertion. When the motor furthermore rotates, disk chucking is surely performed and the disk integrally rotates with the motor.

As mentioned above, according to the present embodiment, even when the rotation lever resumes its original state, the height of the drive pin remains the same as that before disk chucking because the rotation lever contacts the hook portion of the rotor frame, and this makes a disk chucking position of the drive pin fixed to the rotation lever constant, furthermore, enables to prevent floating of the drive pin of the rotation lever and to protect the rotation lever from deformation against variation of magnetic head load and shocks.

[Embodiment 12]

12th embodiment of the present invention will be explained.

Figure 24:
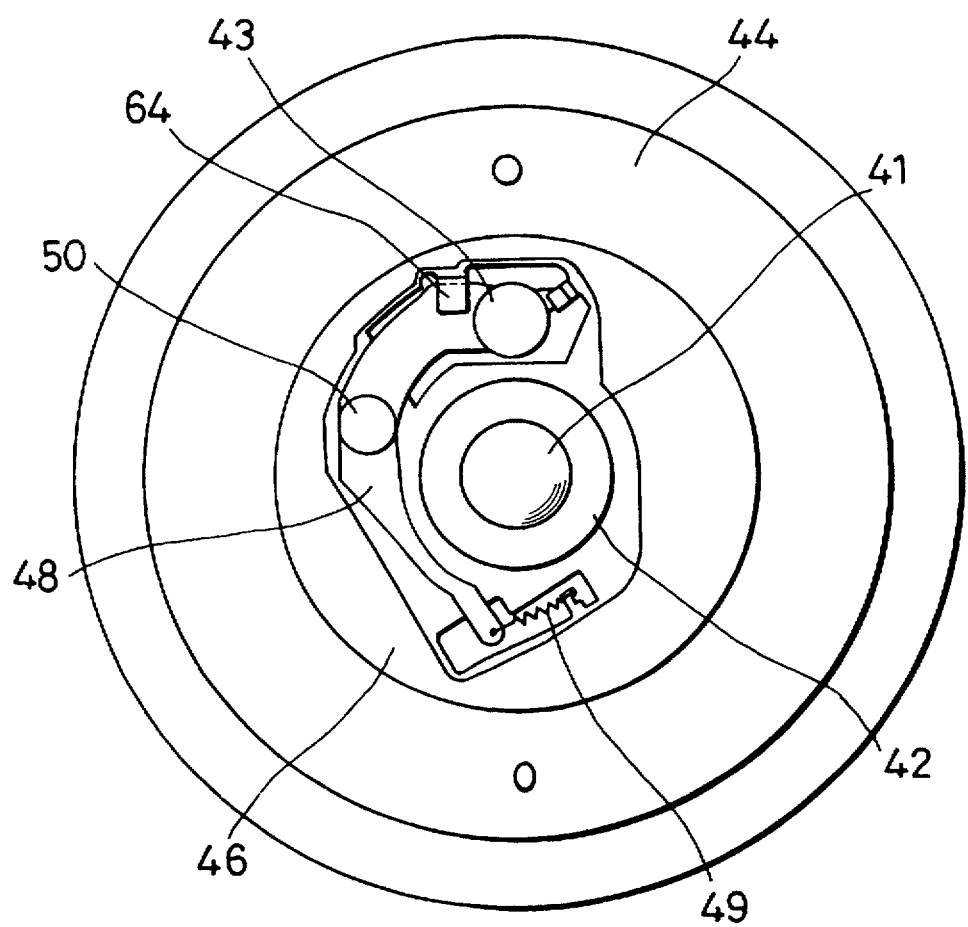
FIG. 24 is a view showing a structure of a hub of one embodiment of the invention.
Figure 25:
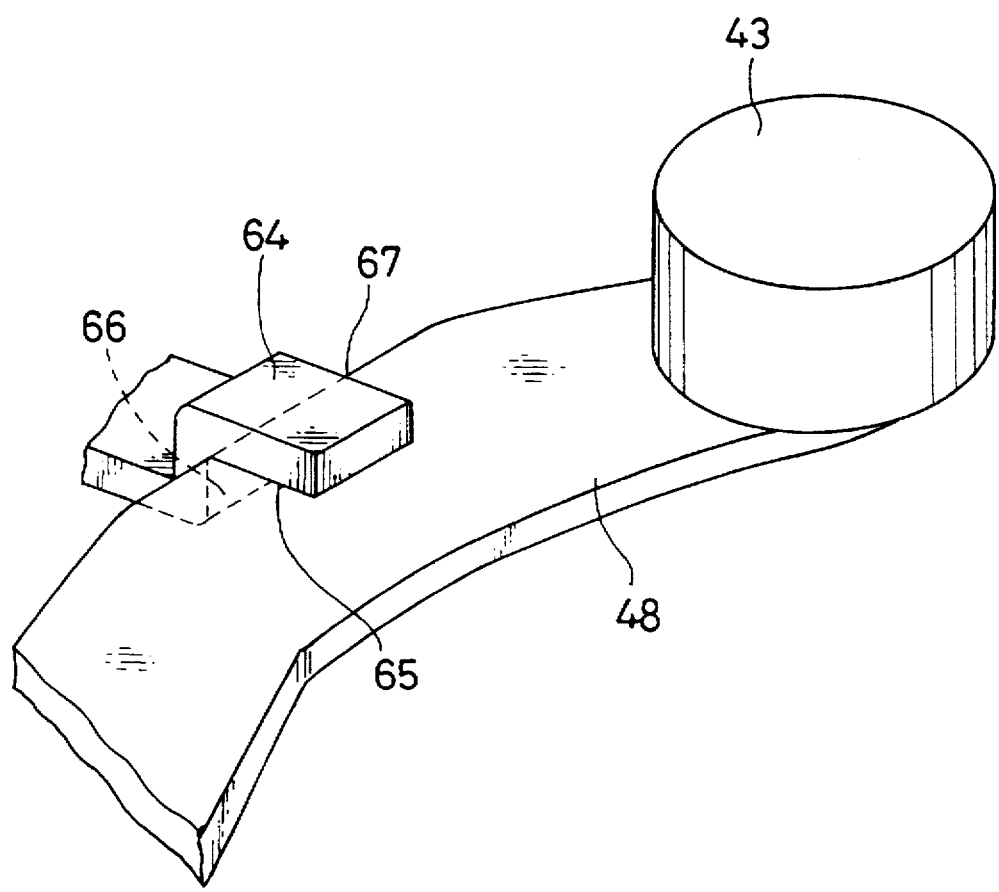
FIG. 25 is an illustration showing that a rotation lever contacts a cut and raised portion of a rotor frame.

FIG. 24 is a view showing a hub structure which contacts a rotation lever of a motor for disk rotation drive with a hook portion of a rotor frame of the motor of one embodiment of the invention. FIG. 25 is a perspective illustration showing a state that a rotation lever contacts a cut and raised portion of the rotor frame.

The same reference numerals 41 to 44, 46, 48, 49, 50 in FIGS. 24 and 25 as that in FIG. 19 of the embodiment of claim 9 indicate the same thing. A reference numeral 64 denotes a hook portion provided by cutting and raising a part of the rotor frame; 65 a reverse face to the outer face of the hook portion 64; 66 a raised face of the hook portion 64; 67 a position at which the rotation lever 48 contacts with the raised face of the hook portion.

As to the motor for disk rotation drive structured as mentioned above, its performance will be explained. The principle of the mechanism that a disk is inserted into a disk device and chucked and integrally rotated with a motor is the same as that of the embodiments of FIGS. 19 and 22. Hereafter, differences of the present embodiment from the foregoing ones will be explained in detail.

In a state before installation of the disk (see FIG. 40), the rotation lever 48 is contacted, at its contacting position 67, with the raised face 66 of the cut and raised hook portion 64 of the rotor frame. The rotation lever 48 and the drive pin 43 fixed to the lever end are prohibited from further moving toward outer periphery. Furthermore, the rotation lever 48 is made to contact the reverse face 65 to the outer face of the cut and raised hook portion 64 provided on the rotor frame, and this restrains the rotation lever 48 and the drive pin 43 from moving more upward.

On disk installation, when a position of the drive pin insertion hole 175 and a position of the drive pin 43 do not meet, the drive pin 43 is pushed in the direction of the shaft axis with the disk hub by attractive force exerted between the hub magnet 46 and the disk hub, thereby to hide in the interior of the motor. At that time, the rotation lever 48 bends toward the motor side, and thus separates from the reverse face 65 to the top face of the cut and raised hook portion 64 provided on the rotor frame. At that time, the rotation lever 48 bends in the interior of the motor, however, within the range of this bending, the contacting position 67 of the rotation lever 48 moves to the interior of the motor in contacting with the raised face 66 of the cut and raised hook portion of the rotor frame.

When the motor starts to rotate and a position of the drive pin 43 and a position of the drive pin insertion hole of the disk hub meet, the drive pin is inserted into the drive pin insertion hole by elastic return force, of the rotation lever 48, toward the disk hub. The bent rotation lever 48 contacts the face 65 of the hook portion 64 of the rotor frame by its elastic return force. This restrains the rotation lever 48 and the drive pin 43 from moving more upward than its top face and resumes the initial state, that is, the state before disk insertion.

When the motor furthermore rotates, the rotation lever 48 separates from the raised face 66 of the cut and raised hook portion 64 of the rotor frame and contacts with and rolls on the outer crest face of the drive pin insertion hole of the disk hub by the activating spring 49. When the rotation lever engages in a manner that relative movement between the disk hub and the drive pin 43 becomes zero, the motor torque is transmitted to the disk hub and the disk integrally rotates with the motor.

As mentioned above, according to the present embodiment, before chucking, the drive pin is in a constant distance from the shaft and a constant position and height. Therefore the chucking is stabilized. Furthermore, floating of the drive pin of the rotation lever can be prevented, and the rotation lever can be protected from deformation against variation of magnetic head loads and shocks.

[Embodiment 13]

A 13th embodiment of the invention will be explained.

Figure 26:
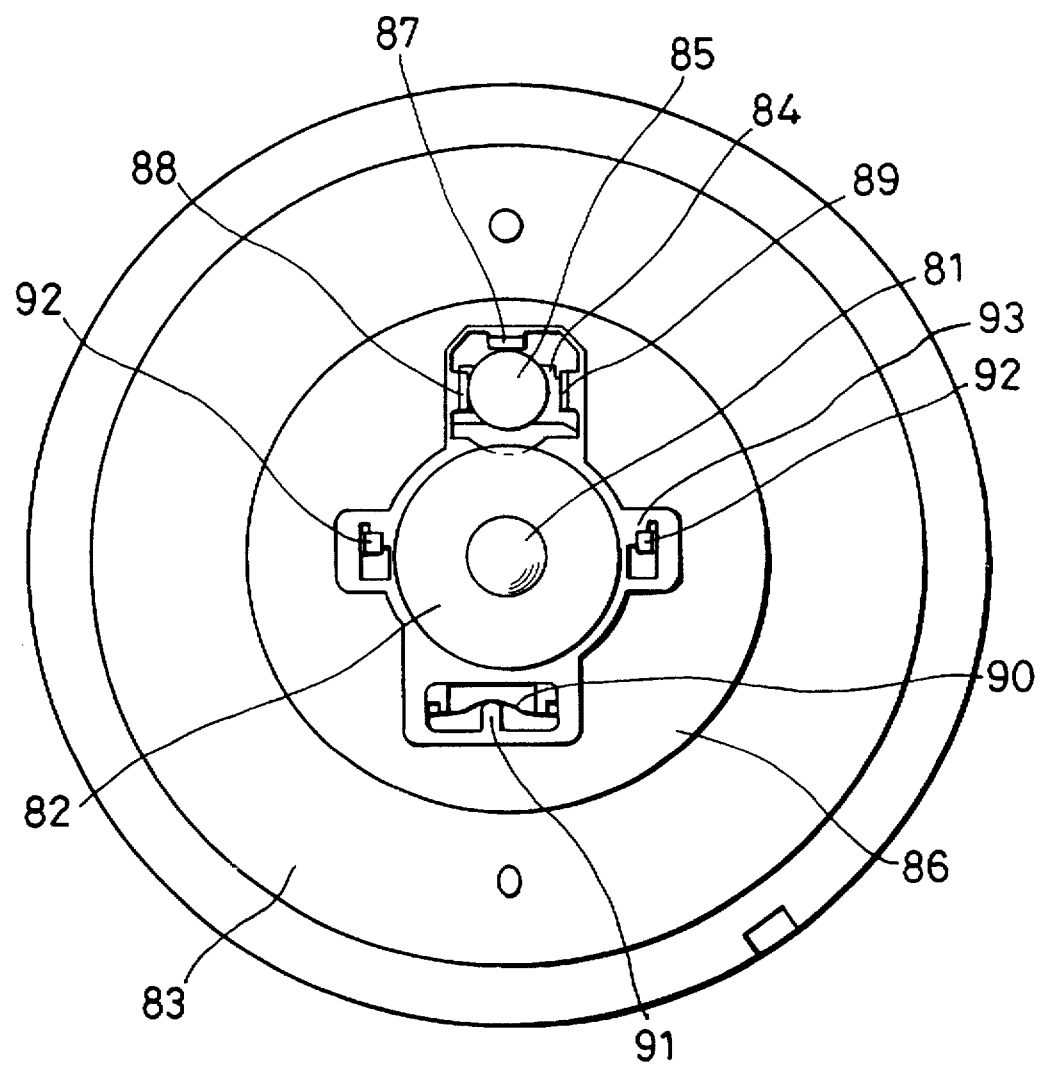
FIG. 26 is a view showing a structure of a hub of one embodiment of the invention.
Figure 27:
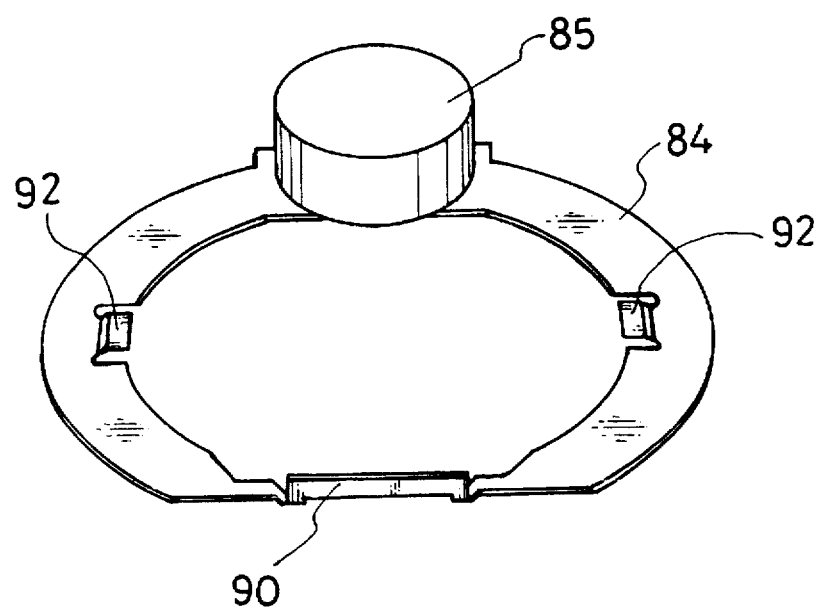
FIG. 27 is a perspective view showing a flat spring with a drive pin.
Figure 28:
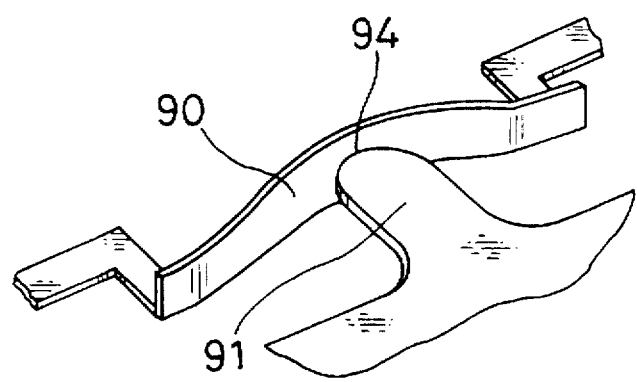
FIG. 28 is an illustration showing a method of activation by a flat spring.
Figure 29:
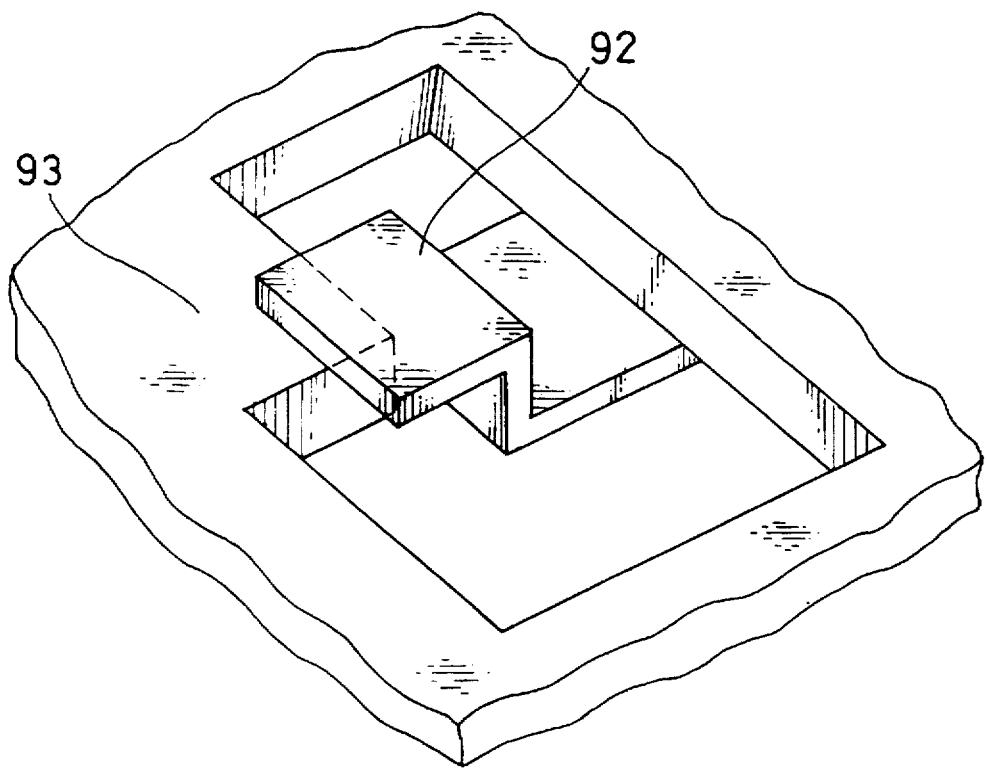
FIG. 29 is a view showing a method of supporting a flat spring on a portion of a rotor frame.
Figure 30:
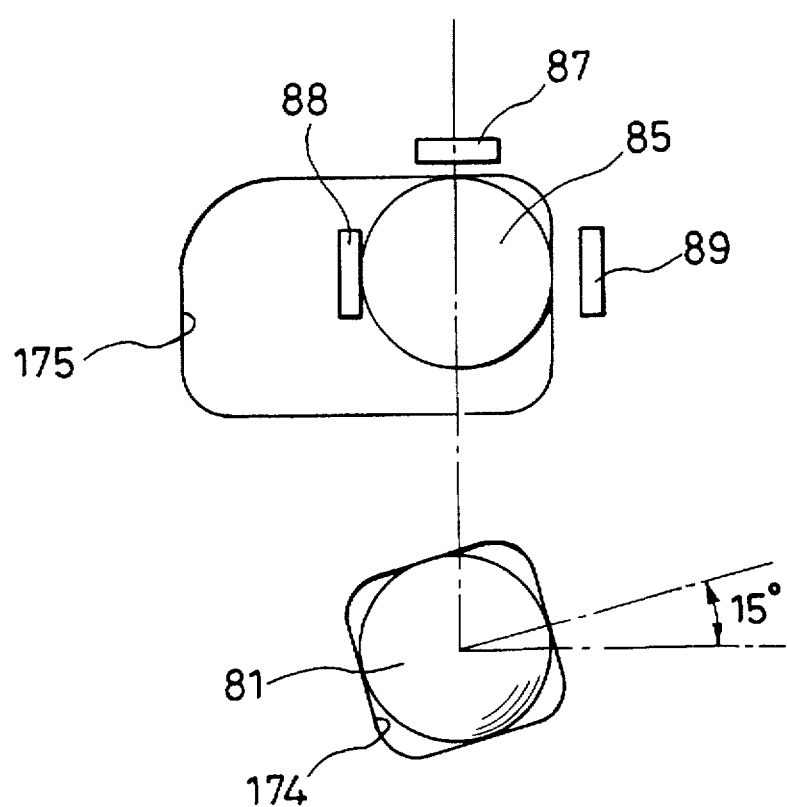
FIG. 30 is an illustration showing a drive pin and a shaft in a state of disk hub chucking.

FIG. 26 is a view showing a hub structure of a motor for disk rotation drive according to one embodiment of the invention. FIG. 27 is an illustration showing a flat spring provided with a drive pin. FIG. 28 is an illustration showing an activating method by a flat spring. FIG. 29 is a view showing a method of supporting a flat spring on a rotor frame. FIG. 30 is an illustration showing a drive pin and a shaft in a state that a disk hub is chucked.

In FIGS. 26, 27, 28, 29 and 30, a reference numeral 81 indicates a shaft; 82 a spindle hub; 83 a rotor frame; 84 a flat spring; 85 a drive pin; 86 a hub magnet; 87 a first cut and raised portion of the rotor frame; 88 a 67 second cut and raised portion of the rotor frame; 89 a third cut and raised portion of the rotor frame; 90 a bent portion of the flat spring which is on the reverse side of the drive pin to the shaft and bent at an angle of about 90:91 a protruding portion of the rotor frame; 92 a hook portion of the flat spring; and 93 a receiving portion of the rotor frame which receives the hook portion of the flat spring.

As to the motor for disk rotation drive structured as mentioned above, its performance will be explained.

In a state before installation of the disk (see FIG. 40), the protruding portion 91 of the rotor frame is so fixed that it pushes the flat spring bent portion 90, which is formed by bending a part of the flat spring 84 on the reverse side of the drive pin to the shaft at an angle of about 90 (see FIG. 28) and the flat spring bent portion 90, is curved. Thereby activating force on the drive pin 85 is exerted, and thus the drive pin contacts the first cut and raised portion 87 of the rotor frame. Furthermore, the drive pin 85 attached to the flat spring 84 can move, taking a contacting portion 94 between the flat spring bent portion 90 and the protruding portion 91 of the rotor frame as a supporting point, thus sometimes the drive pin 85 contacts the second cut and raised portion 88. However, the drive pin 85 can move only within an area surrounded by the first, second and third cut and raised portions 87, 88 and 89 and the spindle hub 82. That is, the third cut and raised portion 89 is for restraining a range of drive pin movement, and thus may be structured by the hub magnet.

First, a disk is inserted into a disk device and the disk hub 173 is attracted by the magnetized hub magnet 86, thereby to be installed on the face of the spindle hub 82 as the disk is installed. At the same time the shaft 81 is inserted into the shaft insertion hole 174 of the disk hub. The drive pin 85 is contacted with the cut and raised portion 87 by activating force of the flat spring and is made not to move toward a further outer periphery (see FIG. 28). On disk installation, when a position of the drive pin insertion hole 175 and a position of the drive pin 85 do not meet, the drive pin 85 is pushed in the direction of the shaft axis with the disk hole by attractive force exerted between the hole magnet 86 and the disk hole, thereby to hide in the interior of the motor. At that time, the flat spring 84 bends in the interior of the motor, taking the receiving portions 93 of the rotor frame, which receive the flat spring hook portions 92. As both supporting point, but the drive pin 85 moves to the interior of the motor in contacting with the cut and raised portion 87 (see FIG. 29).

When the motor shaft 81 starts to rotate, the disk becomes still by pinch force of the magnetic heads, and the spindle hub 82 rotates relatively to the disk hub. When a position of the drive pin 85 and a position of the drive pin insertion hole of the disk hub meet, the above drive pin 85 is inserted into the drive pin insertion hole by elastic return force of the flat spring 84. The bent flat spring 84 contacts the reverse face to the rotor frame outer face by its elastic return force and resumes an original state, that is, the state before disk insertion.

When the motor shaft 81 furthermore continues to rotate, the drive pin 85 separates from the cut and raised portion 87 of the rotor frame and contacts with and rolls on the outer crest face of the drive pin insertion hole of the disk hub, and is fixed by two crest faces of the second cut and raised portion 88 of the rotor frame and the drive pin insertion hole of the disk hole (see FIG. 30). Then, relative movement between the disk hub and the drive pin 85 becomes zero. At that time, the motor torque is transmitted to the disk, thus the disk integrally rotates with the motor.

[Embodiment 14]

A 14th embodiment of the invention will be explained.

Figure 31:
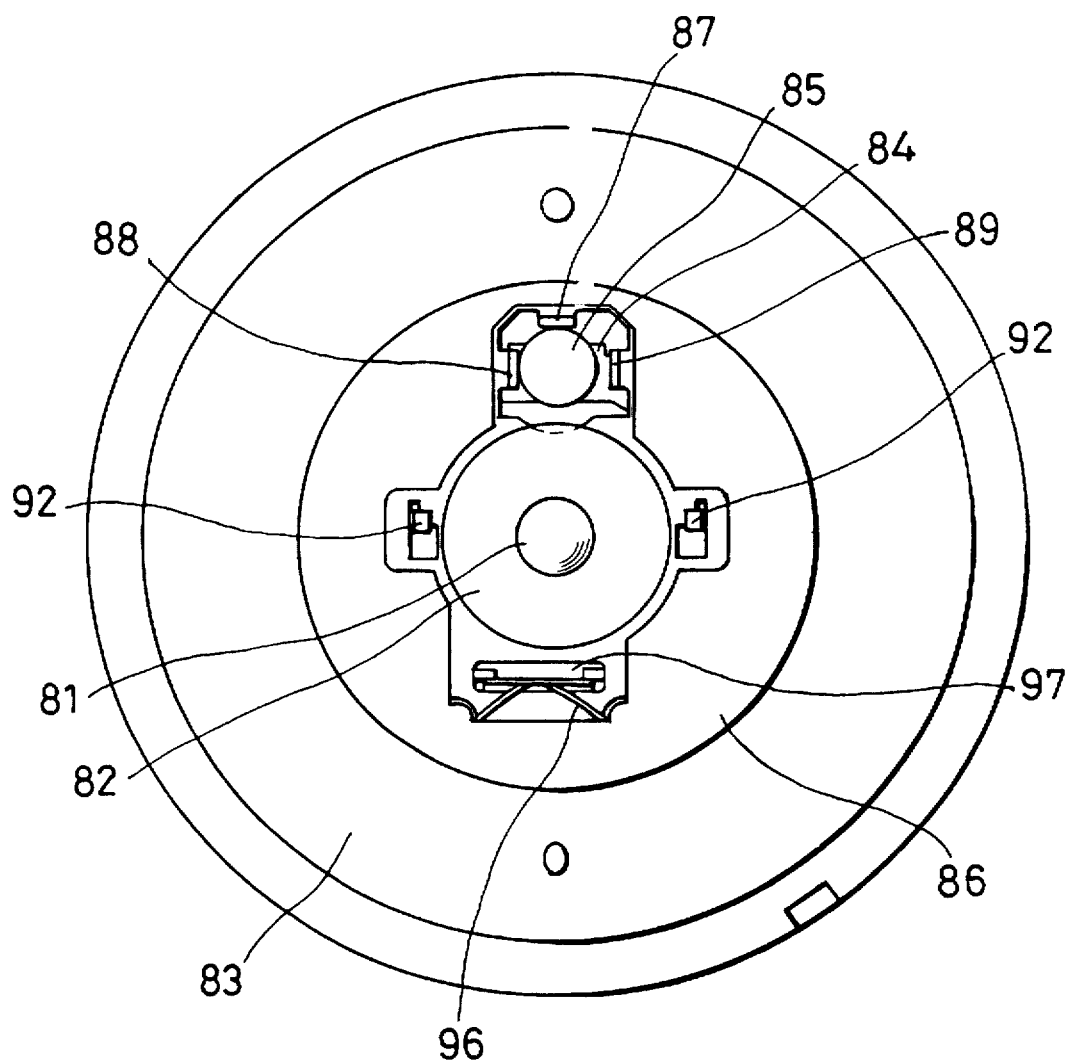
FIG. 31 is a view showing a structure of a hub of one embodiment of the invention.
Figure 32:
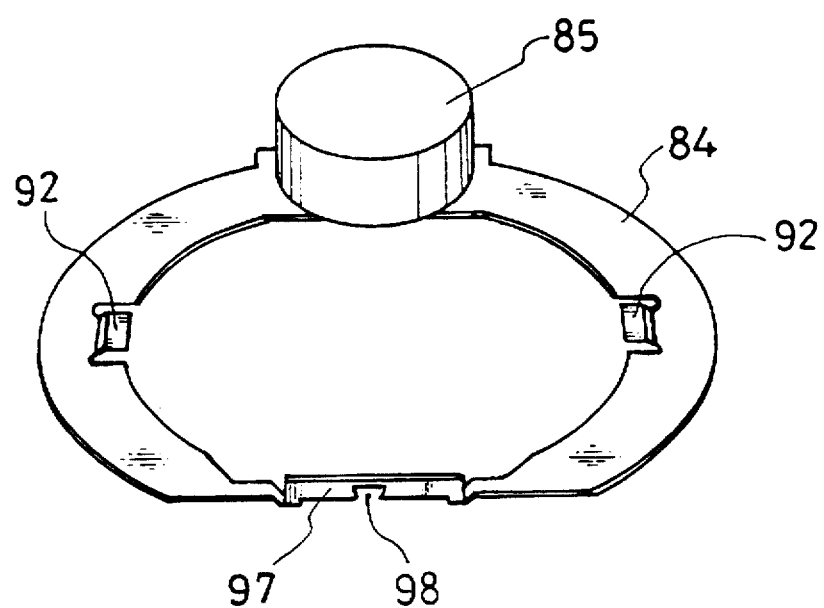
FIG. 32 is a perspective view showing a flat spring with a drive pin.
Figure 33:
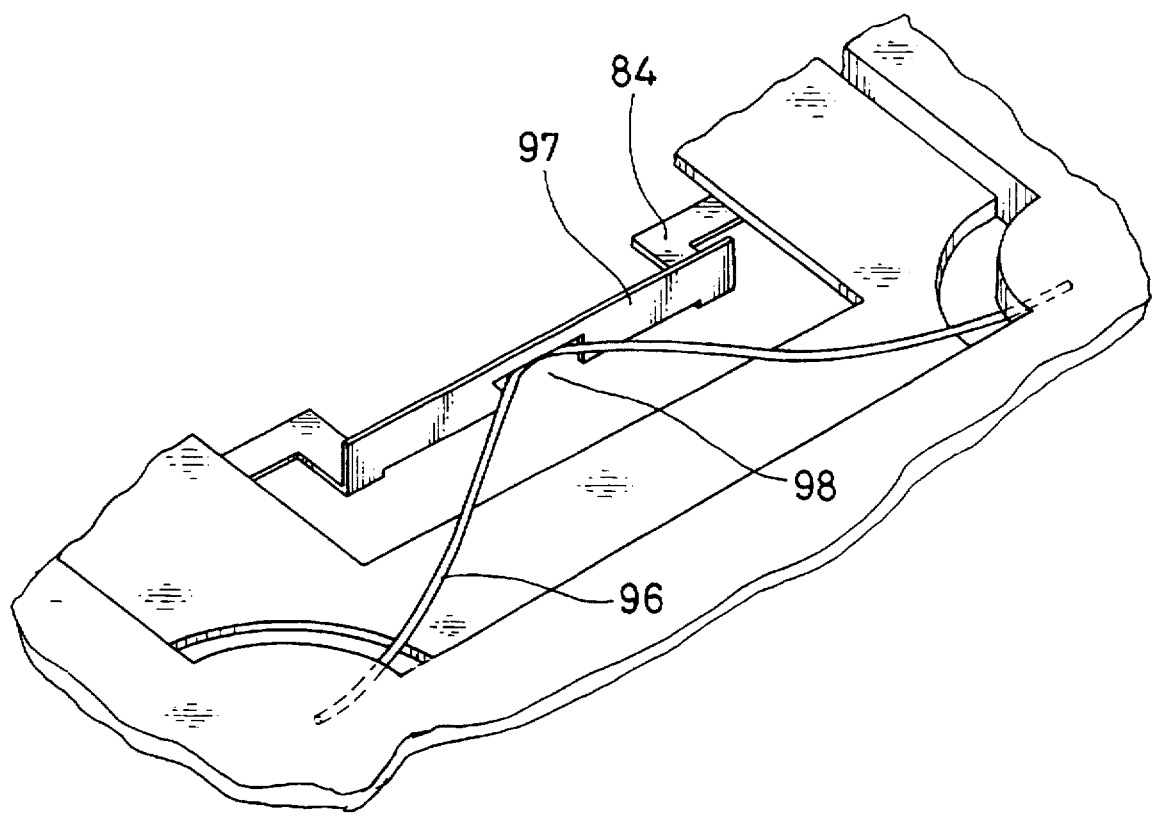
FIG. 33 is an illustration showing a method of activation by a wire spring.

FIG. 31 is an illustration showing a hub structure of a motor for disk rotation drive according to one embodiment of claim 14 of the invention. FIG. 32 is an illustration showing a flat spring provided with a drive pin. FIG. 33 is an illustration showing a method of activation by the flat spring. In FIGS. 31, 32 and 33, the same reference numerals 81 to 89 indicate the same things in FIG. 26, and a reference numeral 96 indicates an activating spring; 97 a flat spring bend portion, with a bending angle of about 90 on the reverse side of the drive pin to the shaft; 98 a portion, provided in the flat spring bend portion 97 for engaging the activating spring 96.

As to the motor for disk rotation drive structured as mentioned above, its performance will be explained. The principle of the mechanism that a disk (see FIG. 40) is inserted into a disk device and chucked, and the disk integrally rotates with the motor is the same as that of the embodiment of FIG. 26. The difference of the embodiment 14 from that of FIG. 26 is use of actuating force generated by a wire spring.

In a state before disk installation, the wire spring is fixed in a curved shape to the portion for engaging the activating spring 96. The activating spring 96 is provided in the flat spring bend portion 97 which is formed by bending the flat spring 84 portion on the reverse side of the drive pin 85 to the shaft 81 (see FIGS. 32 & 33), by an angle of about 90. Thus the wire spring exerts activating force on the drive pin 85, thereby to make it contact the first cut and raised portion 87 of the rotor frame.

[Embodiment 15]

A 15th embodiment of the invention will be explained.

Figure 34:
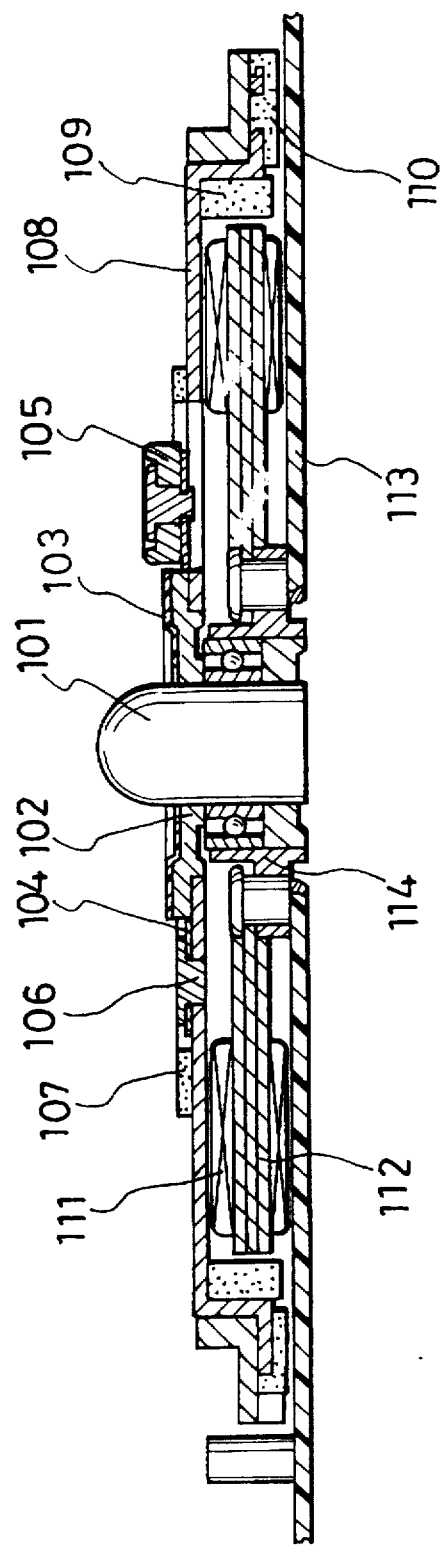
FIG. 34 is a sectional view showing a spindle motor for a floppy disk.
Figure 35A:
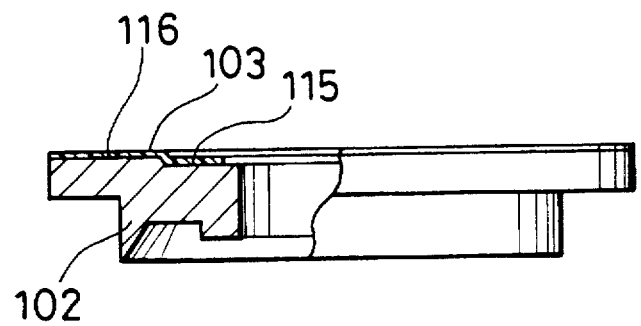
FIGS. 35(a) and 35(b) are views showing a spindle hub, coated with low friction resin layer, of a rotor device, therein
Figure 35B:
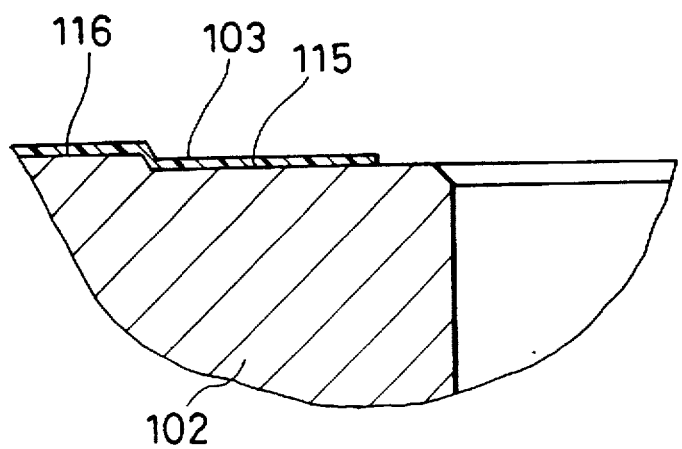

FIG. 34 is a sectional view showing a spindle motor for a floppy disk according to one embodiment of the invention. FIG. 35 is a view showing a spindle hub portion of a motor, (a) is a view before assembling, (b) is a partially enlarged view.

In FIGS. 34 and 35, a reference numeral 101 denotes a shaft; 102 a spindle hub; 103 a low friction resin layer; 104 a rotation lever; 105 a drive pin; 106 a pillar; 107 a hub magnet; 108 a rotor frame; 109 a drive magnet; 110 an FG magnet; 111 a coil; 112 a core; 113 a printed board; 114 a bearing housing.

Here, the spindle hub of the motor has a structure in which an adjacent portion to the motor shaft 101 of the disk hub reception face of the above spindle hub 102 is formed into a concentric circular recess face 115 with respect to the motor shaft 101. A higher face 116 is used for the reception face, and the faces including the higher face 116 and the recess face 115 are coated with a low friction resin layer, moreover the inside of this low friction resin layer reaches the recess portion (FIG. 35).

As to the motor for disk rotation drive structured as mentioned above, its performance will be explained.

First, when a disk (see FIG. 40) is inserted into a disk device, the shaft 101 is inserted into the shaft insertion hole 174 of the disk hub and installed on the reception face of the spindle hub 102 which is coated with the low friction resin layer 103 formed innerly than the drive pin. At this time, the disk hub 173 is attracted by the magnetized hub magnet 107. Then, the motor starts to rotate and the rotor rotates by one revolution with the same mechanism as a conventional type. During this one revolution the drive pin 105 is inserted into the drive pin insertion hole, thereby to rotate and move in the direction of disk chucking. Then the disk is chucked, being activated in the direction of the rotor radius by the activating spring and positioned, taking the motor shaft 101 as the center and the disk integrally rotates with the motor. Thereby, signals are read from or written into the disk.

At this time, the disk hub and the spindle hub 102 contact via the low friction resin layer 103, thus the drive pin 105 quickly slides during its movement to the drive pin insertion hole and insertion in the hole; and after the drive pin is surely inserted into the drive pin insertion hole, the disk is rotation-driven. Examples of the low friction resin layer materials used for the spindle hub are shown in Table 1.

TABLE 1

| Items | Characteristics of the low friction resin layer materials | | |
|---|---|---|---|
| | Molybdenum disulfide | Fluororesin | Graphite |
| Chemical formula | MoS$_2$ | Open | C |
| Crystal structure | Layer, open | Complex | Layer |
| Color | Lead-gray | Milk-white | Blackish-gray |
| Hardness (Mohs) | 1–1.5 | | 1.5–2 |
| Specific gravity | 4.7 | 2.2 | 2.2 |
| Friction coefficient | 0.02 | 0.03 | 0.05 |
| Maximum allowable working temp (°C.) | 320 | 260 | 430 |
| Decomposition temp (°C.) | 1098 | 727 | 3498 |

As mentioned above, according to present embodiment, the spindle hub is so structured that an adjacent portion to the motor shaft 101 of the disk hub reception face of the above spindle hub 102 is formed into a concentric circular recess face 115 with respect to the motor shaft 101. A higher face 116 is used for the reception face, and the faces including the higher face 116 and the recess face 115 are coated with a low friction resin layer. Moreover the inside of this low friction resin layer reaches the recess portion. Structuring the spindle hub as mentioned above enables to reduce variation of the disk hub and to do stabilized chucking.

[Embodiment 16]

A 16th embodiment of the invention will be explained.

Figure 36A:
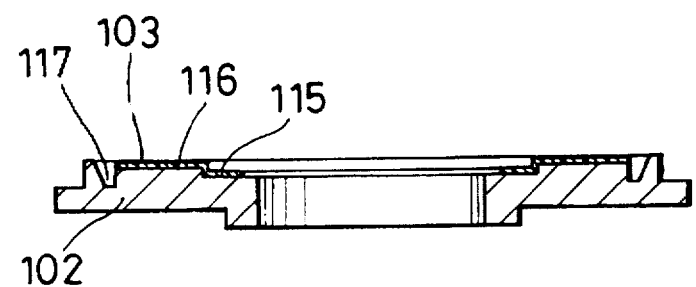
FIGS. 36(a) and 36(b) are views showing a spindle hub, coated with low friction resin layer, of a rotor device, therein
Figure 36B:
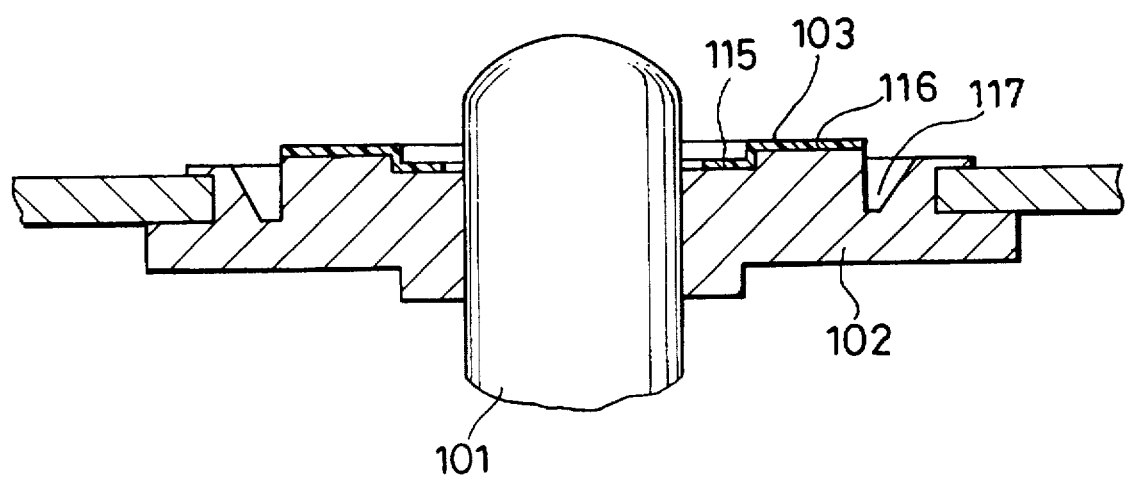

FIG. 36 is a view showing a spindle hub of a spindle motor for a flexible disk according to one embodiment of the invention. FIG. 36(a) is a view showing the spindle hub before assembling. FIG. 36(b) is a sectional view showing a spindle hub attached to a rotor frame. In FIG. 36 a reference numeral 101 denotes a shaft; 102 a spindle hub; 103 a low friction resin layer; and 108 a rotor frame.

Here, the spindle hub is so structured that an adjacent portion to the motor shaft 101 of the disk hub reception face of the above spindle hub 102 is formed into a concentric circular recess face 115 with respect to the motor shaft 101. A higher face 116 is used for the reception face, and furthermore, a face 117 considerably lower than the higher face 116 is formed outside the periphery of the higher face 116, thus the spindle hub face is made to have these faces 115, 116, 117. Then the spindle hub face which receives the disk hub is coated with the low friction resin layer. Thus the area of the disk hub reception face can be controlled and stabilized chucking can be performed.

[Embodiment 17]

A 17th embodiment of the invention will be explained.

Figure 37A:
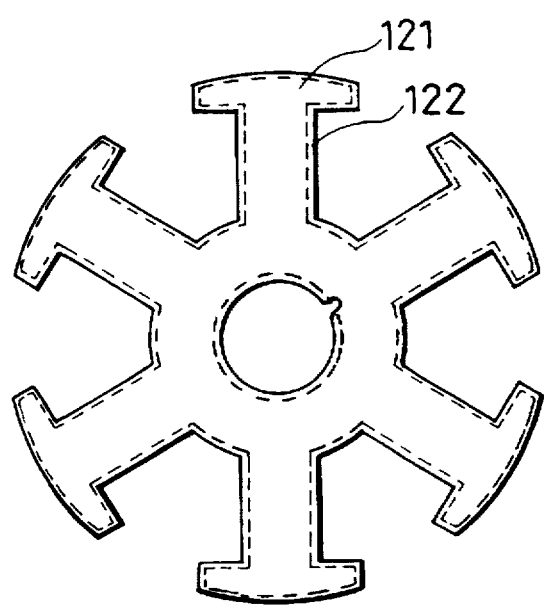
FIG. 37(a) and FIG. 37(b) are views showing a laminated core of a motor according to one embodiment of the invention.
Figure 37B:
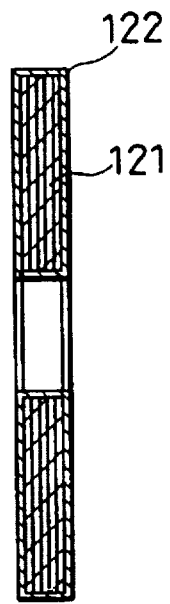

FIG. 37(a) and FIG. 37(b) are views showing a laminated core of a motor according to one embodiment of the invention. FIG. 37(b) is a sectional view of FIG. 37(a).

In FIG. 37(a) and FIG. 37(b), a reference numeral 121 indicates a core; 122 a rust prevention treatment film other than painting.

The 11th through 24th embodiment of the invention will be explained basing on FIG. 37.

Generally, in chemical conversion treatment for iron products, rust prevention oil is usually painted after chemical conversion treatment, and the rust prevention oil is sometimes painted on a core.

[Embodiment 18]

An 18th embodiment of the invention will be explained.

The present embodiment corresponds to the case in which the rust prevention treatment film of FIG. 37 is a electroless nickel plating layer. An example of treating a laminated core by the electroless nickel plating will be explained.

First, the laminated core is dipped in a known degreasing solution of 50° C. for 5 minutes for degreasing, then dipped in acid at ordinary temperature for 1 minute to be acid-activated. Thereafter, it is washed and dipped in a bath for a known electroless Ni-plating liquid solution of 90° C. for 15 minutes, to be plated by electroless nickel plating, and washed again, then dipped in sodium bichromate solution at ordinary temperature for 1 minute and washed and dried.

Electroless nickel plating can be applied to the whole of the core surface with a thickness of 3 am to 10 am, therefore an air gap (clearance) between the magnet and the core causes no problem in assembling a motor. Thin electroless nickel plating can be applied to the core, therefore the core before the treatment or after the treatment can be integrally molded with resin, using the same metal mold.

[Embodiment 19]

A 19th embodiment of the invention corresponds to the case in which the rust prevention treatment film of FIG. 37 is a phosphoric acid manganese chemical conversion treatment film. An example of process of giving the phosphoric acid manganese chemical conversion treatment to a laminated core will be explained.

First, the laminated core is dipped in a bath of the known degreasing solution Ace Clean A-220 at 50° C. for 5 minutes to be degreased, washed and dipped in a bath of phosphoric acid manganese solution at 95°–99° C. for 15 minutes to be film-treated. Thereafter the core is washed and dipped in a bath of water soluble emulsion-base rust preventives at ordinary temperature for 1 minute to be after-treated and dried.

In a similar way to electroless nickel plating, the phosphoric acid manganese chemical conversion treatment can provide a film thickness of 3–10 μm on the whole of the core surface, therefore an air gap (clearance) between the magnet and the core causes no problem in assembling a motor. Furthermore, a thin film of phosphoric acid manganese chemical conversion treatment can be applied to the core, thus the core before the treatment or after the treatment can be integrally molded with resin, using the same metal mold. The phosphoric acid manganese treatment is also called parkerizing treatment.

[Embodiment 20]

A 20th embodiment of the invention corresponds to the case in which the rust prevention treatment film of FIG. 37 is a cool phos acid treatment film. An example of process of applying the cool phos acid treatment to a laminated core will be explained.

First, the laminated core is dipped in a known degreasing solution for 30 seconds to be degreased and subjected to cool phos acid treatment for 180 seconds, dip rinse for 30 seconds, vapor rinse for 15 seconds and dipped in resin liquid for 15 seconds to be coated with the resin.

In a similar way to electroless nickel plating, the cool phos acid chemical conversion treatment can provide a film thickness of 2–10 μm on the whole of the core surface, therefore an air gap (clearance) between the magnet and the core causes no problem in assembling a motor. A thin film of cool phos acid chemical conversion treatment can be applied to the core, thus the core before the treatment or after the treatment can be integrally molded with resin, using the same metal mold.

[Embodiment 21]

A 21st embodiment of the invention corresponds to the case in which the rust prevention treatment film of FIG. 37 is a low temperature blackening treatment film. An example of process of applying the low temperature blackening treatment to a laminated core will be explained.

First, the laminated core is dipped in the known solution of 55° C. for 10 minutes to be degreased and dipped in a known blackening solution for 10 minutes, and dipped in a bath of water-soluble emulsion-base rust preventives solution of the room temperature for 2 minutes and dried.

[Embodiment 22]

A 22nd embodiment of the invention corresponds to the case in which the rust prevention treatment film of FIG. 37 is a high temperature blackening treatment film. An example of process of applying the high temperature blackening treatment to a laminated core will be explained.

First, the laminated cores is dipped in the known solution of 55° C. for 10 minutes to be degreased and dipped in mixed solution of caustic soda solution, phosphoric acid soda, sodium nitrite and water at 140°–150° for 30 minutes, and dipped in a bath of water soluble emulsion-base rust preventives solution at the room temperature for 2 minutes and dried.

Blacking treatment generally means high temperature blackening. There are many kinds of blackening compositions. Among them, high temperature treatment by using high concentration caustic soda solution and a small amount of oxidant can produce a most gloss coat of $Fe_3O_4$.

The blackening treatment can provide a film thickness of 3–10 am on the whole of the core surface, therefore an air gap (clearance) between the magnet and the core causes no problem in assembling a motor. Furthermore, a thin film of blackening treatment can be applied to the core, thus the core before the treatment or after the treatment can be integrally molded with resin, using the same metal mold.

[Embodiment 23]

A 23rd embodiment of the invention corresponds to the case in which the rust prevention treatment film of FIG. 37 is a ferrozink treatment film. An example of process of applying the ferrozinc treatment to a laminated core will be explained.

First, the laminated cores is dipped in the known degreasing solution of 50° C. for 5 minutes to be degreased and dipped in hydrochloric acid of the room temperature for 1 minute to be acid-activated, thereafter dipped in a bath of ferrozink 10 solution at 90° C. for 15 minutes to be subjected to ferrozinc alloy plating, and washed and dipped in nitric acid solution at ordinary temperature for 10 seconds to be activated and then dipped in ferrozinc B 101 solution at 25° C. for 50 seconds to be subjected to black chromate treatment and dried in hot air.

[Embodiment 24]

A 24th embodiment of the invention corresponds to the case in which the rust prevention treatment film of FIG. 37 is a steam treatment film. An example of process of applying the steam treatment to a laminated core will be explained.

First, the laminated core is heated with steam at 500°–600° C. for 30–60 minutes to produce an oxide coat of triiron tetroxide ferric oxide ($Fe_3O_4$) on the core surface. This oxide coat is minute and has effects of wear resistance and anti-corrosion.

This oxide coat treatment can provide a film thickness of 3–10 μm on the whole surface of the core, therefore an air gap (clearance) between the magnet and the core causes no problem in assembling a motor. Furthermore, powder coating can be applied to the core after the steam treatment in order to insulate wound coils from the core. Because of a thin thickness of the oxide coat, the core before the treatment or after the treatment can be integrally molded with resin, using the same metal mold.

[Embodiment 25]

A 25th embodiment of the invention will be explained.

FIG. 38(a) is a front view showing a laminated core of a motor in accordance with the 25th embodiment of the invention. FIG. 38(b) is a view showing a section of FIG. 38(a).

In FIG. 38(a) and FIG. 38(b), a reference numeral 121 denotes a core; 123 an electrodeposition film; 124 a masking portion; 125 an inner diameter portion of the core 121; 126 an outer periphery portion of the core 121; 127 an electrodeposition film on the outer periphery of the core. An example of process of applying the electrodeposition to a laminated core will be explained.

Water soluble or water dispersible coating material is put into a bath and the masking portion 124 of the core 121 is masked with masking material, then the core is dipped in the bath. Then an electrode is fixed to a portion of the conductive core to be coated, electric current is flowed between this electrode and an electrode attached to the bath. At this time, a charged resin particle moved to the core by electrophoresis, thereby to deposit. This deposition is washed and baked.

In the inner diameter portion of the core 121, the electrodeposition film is not formed and the core can be mounted on a motor assembling part, taking this inner diameter portion as a base. Furthermore, if the masking is applied on the outer periphery of the core 121, a gap between the core and the magnet can be stabilized.

In the case of applying electrodeposition to the core, cation type electrodeposition is mainly used. The cation type electrodeposition uses a water solution which is made by neutralizing synthetic resin having a base like an amino group, using organic acid or inorganic acid, or colloid dispersion type resin as a vehicle. An example of materials for electrodeposition is shown in Table 2.

TABLE 2

An example of electrodeposition materials used for cores

| Solid component | Pigment component | Titanium oxide |
| --- | --- | --- |
| | | Carbon black |
| | | Rust preventive pigment |
| | Resin component | Modified epoxy resin |
| | | Block isocyanate |
| Volatile component | Solvent component | Collosive-base solvent |
| | Water | Pure water |

When controlling the components, their temperatures, current conduction conditions in the bath at suitable levels, the electrodeposition film of an easy adjustable small variant thickness can be obtained, and a center value of 40 μm can 10 be controlled even to such a small tolerance of within a range of ±10 μm. The core of the figure is provided with the electrodeposition film 127 on the outer periphery 126. Thus a clearance between the magnet and the core causes no problem is assembling a motor when the thickness of the electrodeposition film is controlled.

Furthermore, by winding a coil with making the electrodeposition film combine insulation between the core and the magnet with the rust prevention, thinning of a motor becomes possible and mass-production and low cost rust prevention treatment can be realized.

[Embodiment 26]

A 26th embodiment of the invention will be explained.

The present invention is different from that of the previous Embodiment 25 is that the electrodeposition is performed by an ultraviolet light hardening type.

General electrodeposition adopts a heat hardening system for hardening a film, and the hardening requires high temperature and long time, thus maintenance cost and energy cost of a baking furnace become high. The ultraviolet high hardening type electrodeposition which makes a film harden during a short time is applied to a core.

[Embodiment 27]

A 27th embodiment of the invention will be explained.

FIG. 39(a) is a front view showing a laminated core of a motor according to the 27th embodiment of the invention, FIG. 39(b) is a view showing a section of FIG. 39(a).

In FIG. 39, a reference numeral 121 indicates a core; 128 an electrodeposition film; 124 a masking portion; 125 an inner diameter portion of the core 121; 129 an outer periphery portion of the core 121; 130 an insulation film of the outer periphery portion 129 of the core. An example of process will be explained in which the outer periphery portion of the laminated core is coated with an insulation layer by a method other than electrodeposition, while other portions are subjected to the electrodeposition.

The outer periphery 129 of the laminated core, which is formed by laminating sheet members on which a coil is wound later, is coated with the insulation film 130 by a method other than the electrodeposition to electrically insulate the outer peripheral surface of the core. Furthermore the masking portion 124 of the core 121 is masked with masking material, and then the core is subjected to the electrodeposition. The insulation layer 130 has the same effect when it is coated with Magic. The electrodeposition film combines insulation between the core and the coil other than rust prevention, and therefore the electrodeposition film should be made thick to some extent, and the insulation film 130 of the core outer periphery 129 is controlled in a manner that it is thinner than the electrodeposition film to narrow a gap between the magnet and the core, thereby the motor performance is improved.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A flexible disk drive motor comprising:
   a frequency generation magnet disposed on a magnet set side face of a flange portion provided, on a rotor frame outer periphery, substantially perpendicularly to a shaft, wherein said flange portion comprises:
   a plurality of hole portions which are chamfered on a side face of said flange portion opposite said magnet set side face; and
   a stepped portion, on said flange portion outer periphery end face, such that said magnet set side face protrudes with respect to said opposite side face, said frequency generation magnet being integrally molded with said hole portions and said stepped portion so that said stepped portion is embraced by said frequency generation magnet from an outer periphery thereof.

2. A flexible disk drive motor comprising:
   a frequency generation magnet disposed on a magnet set side face of a flange portion provided, on a rotor frame outer periphery, substantially perpendicularly to a shaft, wherein said rotor comprises:
   a plurality of hole portions each of which has a chamfer on a side face opposite said magnet set side face of said flange portion; and
   a stepped portion, on an outer periphery end face of said flange portion, such that said magnet set side face protrudes with respect to said opposite side face, wherein said frequency generation magnet is integrally molded with said hole portions and said stepped portion so that said stepped portion is embraced by said frequency generation magnet from an outer periphery thereof.

3. A flexible disk drive motor comprising:
   a shaft;
   a rotor frame surrounding said shaft;
   a flange portion extending about an outer periphery of said rotor frame, said flange portion being substantially perpendicular to said shaft and having a first side face and a second side face opposite said first side face, wherein said flange portion includes a plurality of apertures formed therein extending from said first face to said second face, an end of said apertures adjacent said first face being chamfered, and wherein said second face extends radially outwardly further than said first face so as to define a step on an outer peripheral edge of said flange portion; and
   a frequency generation magnet molded onto said second face so as to fill said apertures and to extend over said outer peripheral edge of said flange portion so as to encompass said step.

* * * * *